United States Patent
Baker et al.

(10) Patent No.: US 11,981,561 B2
(45) Date of Patent: May 14, 2024

(54) SYSTEMS AND METHODS FOR PRODUCING SULFUROUS ACID

(71) Applicant: AGUA DULCE CAPITAL, LLC, Sandy, UT (US)

(72) Inventors: Jon Baker, Sandy, UT (US); Paul Thomson Baker, Holladay, UT (US)

(73) Assignee: AGUA DULCE CAPITAL, LLC, Sandy, UT (US)

( * ) Notice: Subject to any disclaimer, the term of this patent is extended or adjusted under 35 U.S.C. 154(b) by 1116 days.

(21) Appl. No.: 17/050,399

(22) PCT Filed: May 13, 2016

(86) PCT No.: PCT/US2016/032377
§ 371 (c)(1),
(2) Date: Oct. 23, 2020

(87) PCT Pub. No.: WO2016/183450
PCT Pub. Date: Nov. 17, 2016

(65) Prior Publication Data
US 2021/0363009 A1   Nov. 25, 2021

Related U.S. Application Data

(60) Provisional application No. 62/160,980, filed on May 13, 2015.

(51) Int. Cl.
| | | |
|---|---|---|
| *C01B 17/54* | (2006.01) | |
| *B01J 4/00* | (2006.01) | |
| *B01J 19/00* | (2006.01) | |
| *B01J 19/24* | (2006.01) | |

(52) U.S. Cl.
CPC ............. *C01B 17/54* (2013.01); *B01J 4/001* (2013.01); *B01J 19/0013* (2013.01); *B01J 19/0086* (2013.01); *B01J 19/245* (2013.01); *B01J 19/2465* (2013.01); *B01J 2204/005* (2013.01); *B01J 2219/00087* (2013.01); *B01J 2219/0015* (2013.01); *B01J 2219/00157* (2013.01)

(58) Field of Classification Search
CPC ....... C01B 17/54; B01J 4/001; B01J 19/0013; B01J 19/0086; B01J 19/245; B01J 19/2465
See application file for complete search history.

(56) References Cited

U.S. PATENT DOCUMENTS

| | | | | |
|---|---|---|---|---|
| 2,020,850 A | * | 11/1935 | Marquis | .................. B01F 25/20 |
| | | | | 261/21 |
| 3,061,179 A | | 10/1962 | Pendleton | |
| 3,404,956 A | | 10/1968 | Dreschsel et al. | |
| 4,526,771 A | * | 7/1985 | Forbush | .................. C01B 17/54 |
| | | | | 423/539 |
| 5,222,446 A | * | 6/1993 | Edwards | .................. F23G 5/006 |
| | | | | 110/211 |
| 7,867,470 B1 | * | 1/2011 | Marcin | .................. C01B 17/74 |
| | | | | 422/160 |
| 2008/0251953 A1 | | 10/2008 | Robert et al. | |
| 2014/0083253 A1 | | 3/2014 | Lutes et al. | |
| 2015/0039130 A1 | * | 2/2015 | Banerjee | .......... G05B 19/41845 |
| | | | | 700/275 |

OTHER PUBLICATIONS

United States Patent and Trademark Office; International Search Report and Written Opinion issued in Int'l App. No. PCT/US16/32377 dated Sep. 16, 2016; 26 pages.

* cited by examiner

*Primary Examiner* — Yong L Chu
(74) *Attorney, Agent, or Firm* — MASCHOFF BRENNAN

(57) ABSTRACT

A sulfuric acid generating system can include: a primary burn chamber; an exhaust pipe extending from the burn chamber at a first end to an opposite second end; a secondary burn chamber located between the first end and second end; and a primary venturi pump having a gas inlet coupled to an outlet at the second end of the exhaust pipe and having an aqueous media inlet and having a fluid outlet. A method of producing sulfurous acid can include: providing sulfur to the primary burn chamber; burning a first portion of the sulfur in the primary burn chamber to form a first portion of sulfur dioxide; burning a second portion of the sulfur in the secondary burn chamber to form a second portion of sulfur dioxide; and mixing the first portion and second portion of sulfur dioxide with an aqueous composition so as to produce aqueous sulfurous acid.

18 Claims, 12 Drawing Sheets

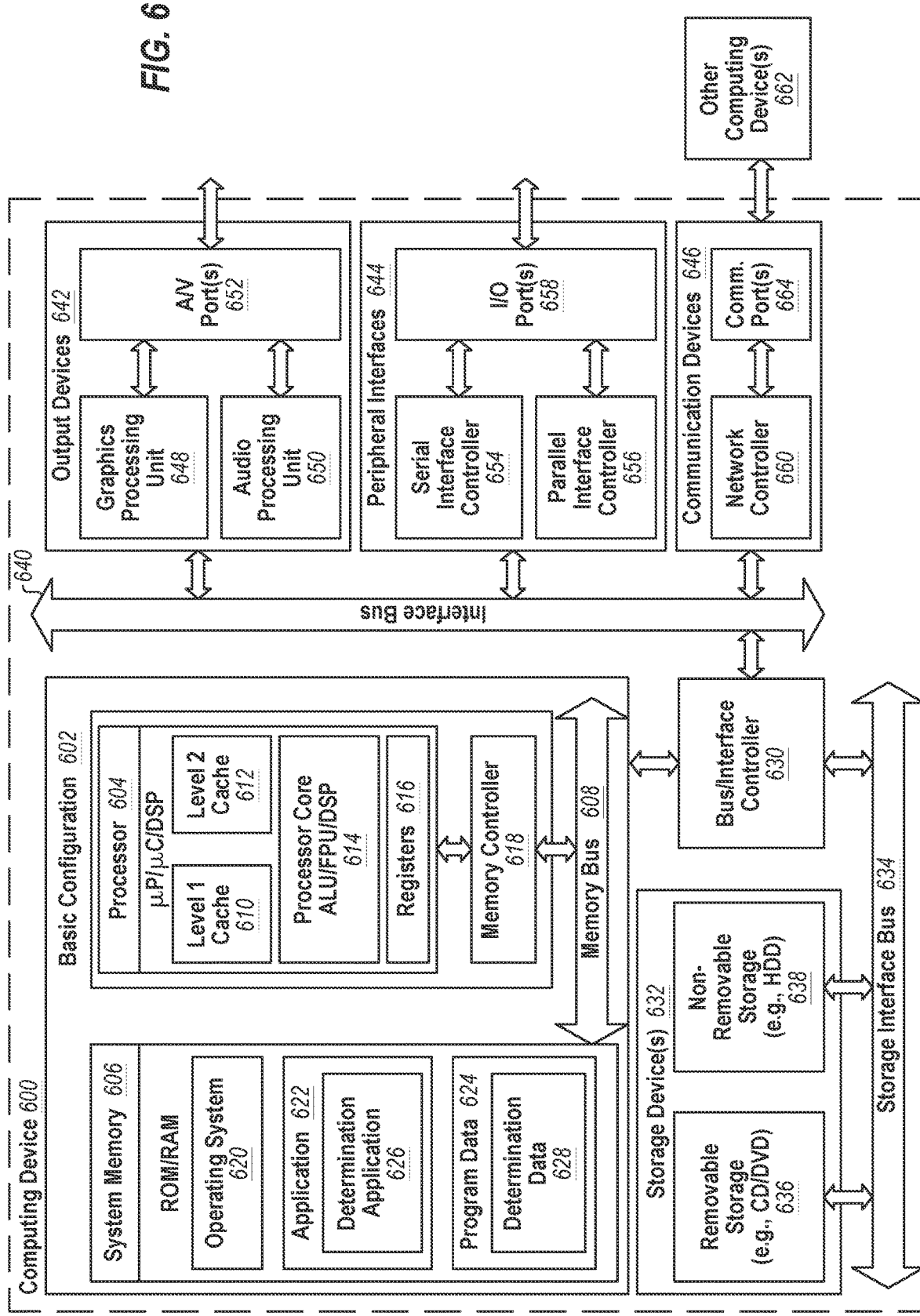

SYSTEMS AND METHODS FOR PRODUCING SULFUROUS ACID

CROSS-REFERENCE

This PCT international patent application claims priority to U.S. Provisional Application No. 62/160,980 filed May 13, 2016, which provisional application is incorporated herein by specific reference in its entirety.

BACKGROUND

Sulfurous Acid (also known as sulphurous acid) is a chemical compound which has a formula $H_2SO_3$. Sulfurous acid is considered to be a weak and unstable acid that is formed when sulfur dioxide dissolves in water. Sulfurous acid is a reducing, as well as a bleaching agent. Accordingly, agricultural soil treatments can include use of an aqueous solution having sulfurous acid. The acidity of sulfurous acid can be 1.5 on the pH scale, but is often at a higher pH (e.g., 2.5) based on the dilution in water. Sulfurous acid is a dibasic acid, and it corresponds to the +4 oxidation state of sulfur. Previous sulfurous acid compositions can have up to 6% sulfurous acid in water (e.g., based on 6% sulfur dioxide). The sulfurous acid compositions can be obtained by the systems and processes of U.S. Pat. No. 6,080,368, or other documents incorporated herein by specific reference.

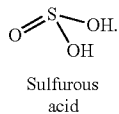

Sulfurous acid

It has been found that prior systems that produce sulfurous acid have a 60% or less conversion rate from sulfur into sulfurous acid, which is not efficient. Also, these systems often produce sulfurous acid compositions having a pH of 2.5 or higher, which may not be sufficient for some applications or not efficient in other applications.

Therefore, it would be advantageous to have systems and methods that can produce a higher sulfur to sulfurous acid conversion efficiency greater than 60%. It would also be advantageous to produce sulfurous acid at a pH less than 2.5 so as to be more acidic.

SUMMARY

In one embodiment, a sulfuric acid generating system can include; a primary burn chamber; an exhaust pipe extending from the burn chamber at a first end so that burned sulfur exhaust traverses the exhaust pipe from the first end to an opposite second end; a secondary burn chamber located between the first end and second end of the exhaust pipe; and a primary venturi pump having a gas inlet coupled to an outlet at the second end of the exhaust pipe and having an aqueous media inlet and having a fluid outlet. In one aspect, a flow deflector can be located between the primary burn chamber and the secondary burn chamber, and where the flow deflector can be between the primary burn chamber and exhaust pipe. In one aspect, the flow deflector can include one or more flow members in a flow deflector chamber that restrict the flow of exhaust from the primary burn chamber to the secondary burn chamber. In one aspect, the exhaust pipe can include in sequence a first section, the secondary burn chamber, and a bend section from the first end to the second end. In one aspect, the first section has a length that is about 15.24 cm+/− 50%, 25%, 15%, 10%, 5%, or 1%, and the secondary burn chamber has a length that is about 45.72 cm+/− 50%, 25%, 15%, 10%, 5%, or 1%.

In one embodiment, a secondary burn member can be associated with the secondary burn chamber, wherein the secondary burn member promotes burning in the secondary burn chamber. In one aspect, the secondary burn member is selected from: an insulation member; heat exchanger; ignition source; external burn chamber; or heater. In one aspect, the secondary burn chamber has a same cross-sectional dimension and/or profile as the exhaust pipe. In one aspect, the secondary burn chamber has a different cross-sectional dimension and/or profile as the exhaust pipe. In one aspect, the secondary burn chamber has a temperature between 232-850 degrees C. In one aspect, a region of the exhaust pipe between the primary burn chamber and secondary burn chamber has a temperature less than 232 degrees C. In one aspect, a region of the exhaust pipe between the secondary burn chamber and second end has a temperature less than 232 degrees C. As such, the exhaust pipe can have a temperature gradient that is lower nearer to the burn chamber (inlet) and higher away from the burn chamber and then lower again even further away from the burn chamber (outlet). This provides for a region in the exhaust pipe that has an increasing temperature gradient from a lower temperature to a higher temperature. A temperature increase in the exhaust pipe can be illustrative of a secondary burn (e.g., secondary burn chamber) in the exhaust pipe away from the outlet of the primary burn chamber. For example, a temperature increase in the exhaust pipe can be greater than or about 50 degrees F. (10 degrees C.) or greater than or about 100 degrees F. (38 degrees C.) or greater than or about 200 degrees F. (93 degrees C.). Thus, from the primary burn chamber to the outlet of exhaust pipe (e.g., inlet of venturi pump) there can be a high temperature in the primary burn chamber then a temperature decrease in the exhaust pipe then a temperature increase in the exhaust pipe and then a temperature decrease in the exhaust pipe at the outlet.

In one embodiment, the second end of the exhaust pipe is inserted into the primary venturi pump past a venturi plate at a distance sufficient to inhibit sulfur buildup in pipes of the system. In one aspect, the fluid outlet of the primary venturi pump is fluidly connected to a primary mixing tank that is fluidly coupled to a secondary venturi pump. In one aspect, a fluid outlet of the secondary venturi pump is fluidly connected to a secondary mixing tank that is fluidly coupled to a tertiary venturi pump. In one aspect, a fluid outlet of the tertiary venturi pump is fluidly connected to a tertiary mixing tank that is fluidly coupled to a quaternary venturi pump.

In one embodiment, the system can include a sulfur hopper connected to the primary burn chamber, in one aspect, the sulfur hopper includes a view window.

In one embodiment, the system can include at least one fluid outlet that supplies aqueous sulfurous acid. In one aspect, the at least one fluid outlet is fluidly coupled with the aqueous media inlet of the primary venturi pump. In one aspect, a plurality of venturi pumps can be in series between the secondary burn chamber and the at least one fluid outlet, wherein the at least one fluid outlet is fluidly coupled with aqueous media inlets of the plurality of venturi pumps. In one aspect, the at least one fluid outlet is fluidly coupled with an aqueous sulfurous acid storage tank. In one aspect, the aqueous sulfurous acid storage tank is fluidly coupled with the aqueous media inlet of the primary venturi pump. In one aspect, the system can include a pump between the aqueous sulfurous acid storage tank and the aqueous media inlet of the primary venturi pump. In one aspect, the system can include a plurality of venturi pumps in series between the secondary burn chamber and the at least one fluid outlet, wherein the aqueous sulfurous acid storage tank is fluidly coupled with aqueous media inlets of the plurality of venturi pumps.

In one embodiment, the system can include a pH sensor in an aqueous sulfurous acid storage tank, which can be made of acid-resistant polymer. In one aspect, a computer can be configured as a system controller, the computer being operably coupled with the pH sensor.

In one embodiment, the system can include a computer configured as a system controller, the computer can be operably coupled to one of more of: pH sensors; flow sensors; pumps; temperature sensors; fluid level sensors; sulfur level sensors; sulfur dioxide sensors; or oxygen sensors. In one aspect, the exhaust pipe has one or more temperature sensors, which can be connected to the computer. In one aspect, the computer can have a non-transitory memory device with computer-executable instructions for controlling operational parameters of the system.

In one embodiment, A method of producing sulfurous acid, the method comprising: providing the system of one of the embodiments described herein; providing sulfur to the primary burn chamber; burning a first portion of the sulfur in the primary burn chamber to form a first portion of sulfur dioxide; burning a second portion of the sulfur in the secondary burn chamber to form a second portion of sulfur dioxide; mixing the first portion and second portion of sulfur dioxide with an aqueous composition so as to produce aqueous sulfurous acid. In one aspect, the burning of the first portion and the second portion of sulfur burns greater than or about 90% of total sulfur, or greater than or about 95% of total sulfur, or greater than or about 99% of total sulfur, or about 100% of total sulfur. In one aspect, the method can include operating the system so that the secondary burn chamber has a burn temperature between about 232-850 degrees C. In one aspect, the method can include operating the system so that a first section of the exhaust pipe between the primary burn chamber and secondary burn chamber has a temperature less than about 232 degrees C. In one aspect, collecting the aqueous sulfurous acid in a storage tank.

In one embodiment, the method can include introducing the aqueous composition into the primary venturi pump in order to mix the aqueous composition with the first and second portions of sulfur dioxide, the aqueous composition being previously untreated by the system. In one aspect, the method can include introducing the aqueous composition into the primary venturi pump in order to mix the aqueous composition with the first and second portions of sulfur dioxide, the aqueous composition being devoid of sulfurous acid.

In one embodiment, the method can include introducing the aqueous composition into the primary venturi pump in order to mix the aqueous composition with the first and second portions of sulfur dioxide, the aqueous composition being previously treated by the system and being recycled to the primary venturi pump. In one aspect, the method can include introducing the aqueous composition into the primary venturi pump in order to mix the aqueous composition with the first and second portions of sulfur dioxide, the aqueous composition comprising sulfurous acid.

In one embodiment, the method can include recycling the collected aqueous sulfurous acid back to one or more venturi pumps of the system for further acidification by sulfur dioxide. In one aspect, the method can include recycling the collected aqueous sulfurous acid through one or more recycling cycles until obtaining a desired pH of aqueous sulfurous acid. In one aspect, the produced aqueous sulfurous acid has a less than or about 2.25, or has a pH less than or about 2, or has a pH less than or about 1.75, or has a pH less than or about 1.5, or has a pH about 1.3. The method can include storing the aqueous sulfurous acid until the pH drops to about 1.0. In one aspect, the method can include passing the formed sulfur dioxide through at least three venturi pumps, which can lower the pH.

In one embodiment, the method can include deflecting cyclonic exhaust in the primary burn chamber with a deflector before the first portion of sulfur dioxide reaches the secondary burn chamber. In one aspect, the method can include breaking the cyclonic exhaust before entering the exhaust pipe. In one aspect, the method can include slowing exhaust from the primary burn chamber before reaching the secondary burn chamber. In one aspect, the method can include modulating exhaust flow through the exhaust pipe so as to burn sulfur in the secondary burn chamber.

In one embodiment, the method can include burning sublimated sulfur in the secondary burn chamber, wherein the sublimated sulfur that sublimates from the primary burn chamber.

In one embodiment, the method can include viewing sulfur through a view window in a sulfur hopper that is connected to the primary burn chamber.

In one embodiment, the method can include measuring pH of the produced aqueous sulfurous acid; and recycling the produced aqueous sulfurous acid back through the system if the pH is above a target pH threshold.

In one embodiment, the method can include measuring pH of the produced aqueous sulfurous acid; and collecting the produced aqueous sulfurous acid for use if the pH is at or below a target pH threshold.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 6 is a schematic representation of a computer that can be used as a controller for a system that produces sulfurous acid.

DETAILED DESCRIPTION

Figure 1:
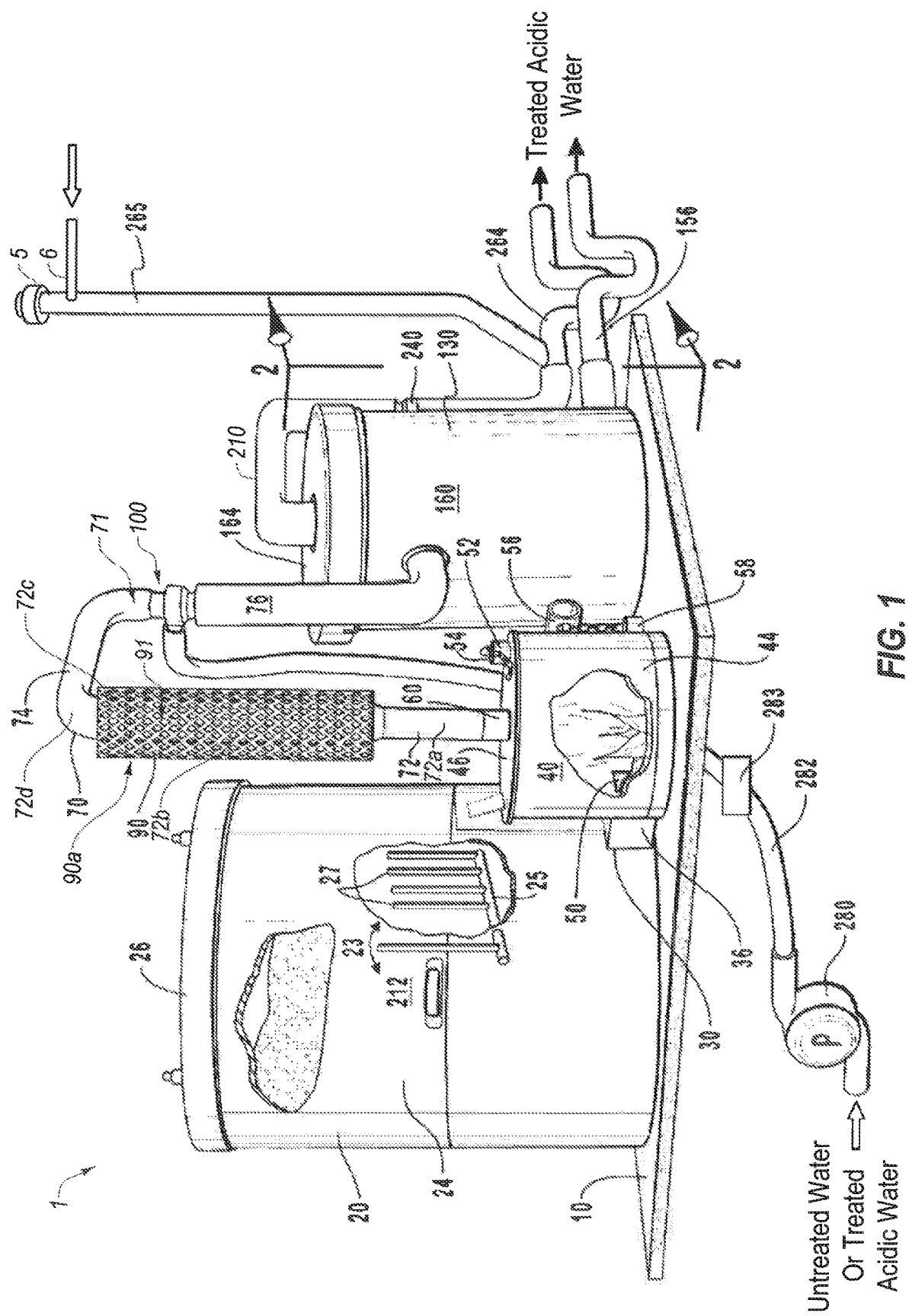
FIG. 1 illustrates an embodiment of a system that produces sulfurous acid.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, this invention presents a sulfurous acid generating system and method that increases the sulfur burn efficiency and production of sulfur dioxide gas, and employs a combination of novel blending and mixing mechanisms with water to form sulfurous acid. The systems and methods can maximize the efficiency and duration of contact between sulfur dioxide gas and water to form sulfurous acid. The system can be configured as an open non-pressurized system. The systems and method can be operated, without employing a countercurrent absorption tower.

In one embodiment, a system for preparing sulfurous acid includes a burn chamber with a vertical exhaust pipe extending from the burn chamber, where the vertical pipe has an upper section configured to implement a secondary burn. The primary burn is in the burn chamber, and as burn exhaust travels up the vertical exhaust pipe, a secondary burn occurs. In one aspect, the secondary burn occurs in a secondary burn region of the vertical exhaust pipe. In one aspect, the vertical exhaust pipe has top region that is shaped like a candy cane with the lower column of the candy cane attached to the primary burn chamber, where the lower column extends vertically through a middle column section then to an upper column section before bending around from vertical to horizontal and then pointing downward so that the entire shape of the exhaust pipe is like a candy cane. The upper bend section of the candy cane (e.g., horizontal section) is considered to be the traverse pipe and the portion that points downwardly again is the down pipe. The secondary burn region can occur in any section of the candy cane. However, the secondary burn region can advantageously be in the middle column section or upper column section. In some instances the secondary burn region can be in the traverse pipe. In any aspect, the second burn region can be implemented in any sulfurous acid production system, such as shown in FIG. 1.

It has been found that traditional sulfur burners do not completely or efficiently burn the sulfur. As such, sulfur particles are entrained in the exhaust gas and pass up through the vertical exhaust pipe, and eventually end up in the aqueous sulfurous acid solution or as residue in the pipes of the system. Such sulfur residue can clog any of the pipes and can cause the venturi pumps to malfunction, and can also deteriorate sensors. It is thought that as much as 40% of the sulfur does not burn in the burn chamber, but is carried out of the burn chamber with the exhaust gas. It is possible that some of the sulfur that is not burned (e.g., burning oxidizes the sulfur) is present in the exhaust gas. It is possible that a portion of this vaporized sulfur blends with water in the mixing chamber, but does not convert to sulfurous acid. Once in the water stream this vaporized sulfur can remain as sulfur and can cause soil sulfur levels to rise. As such, burning any sulfur in the exhaust gas from the first burn chamber can improve efficiency and reduce sulfur in the product, which can be accomplished in the secondary burn chamber. Also, condensation of vaporized sulfur can form solid sulfur, which can be problematic in the system by fouling the pipes and contaminating the sulfurous acid product with solid sulfur. Just because the sulfur disappears from the primary burn chamber, and a portion of it is converted to sulfur dioxide gas, does not mean all of the sulfur is converted into sulfur dioxide gas, but rather is either vaporized as one of the many solid forms of sulfur or is a gaseous form of sulfur that is not actually oxidized into sulfur dioxide, and thereby the secondary burn chamber can oxidize such sulfur into sulfur dioxide. Due to the higher temperature of the burn chamber, some of the sulfur likely is sublimated or vaporized and exits with the exhaust gas. The sublimated, vaporized, or unburned sulfur does not contribute to the production of sulfurous acid, and the higher amount of sublimated, vaporized, or unburned sulfur decreases the efficiency of the sulfur burner and production of sulfurous acid. Now, it has been found that this sublimated, vaporized, or unburned sulfur can be burned and oxidized in a secondary burn chamber to increase the efficiency of conversion of sulfur to sulfur dioxide. Various factors can be used to cause the formation of a secondary burn chamber in the exhaust pipe, such as: active heating; passive heating by insulation; reduction or modulation of exhaust flow rates; residence time in the exhaust pipe; length of the exhaust pipe; diameter of the exhaust pipe; ratio of pipe width and length, burn chamber vortex breaking, exhaust pipe vortex breaking, modulate oxygen content of exhaust, modulating airflow into the primary burn chamber, insulation of a channel feeding sulfur to the primary burn chamber, insulation of channel feeding the secondary burn chamber, and likely others. The secondary burn chamber can inhibit: sulfur exiting out into the atmosphere as a vapor; and/or sulfur condensing back into a solid to clogs the inside of the piping or flowing out with the aqueous sulfurous acid as a contaminant. Thus, the secondary burn chamber can be used to burn sulfur in the exhaust pipe, thereby inhibiting exhaust sulfur or reformed sulfur that is carrier out with sulfurous acid and inhibiting contamination of the product.

Figure 1A:
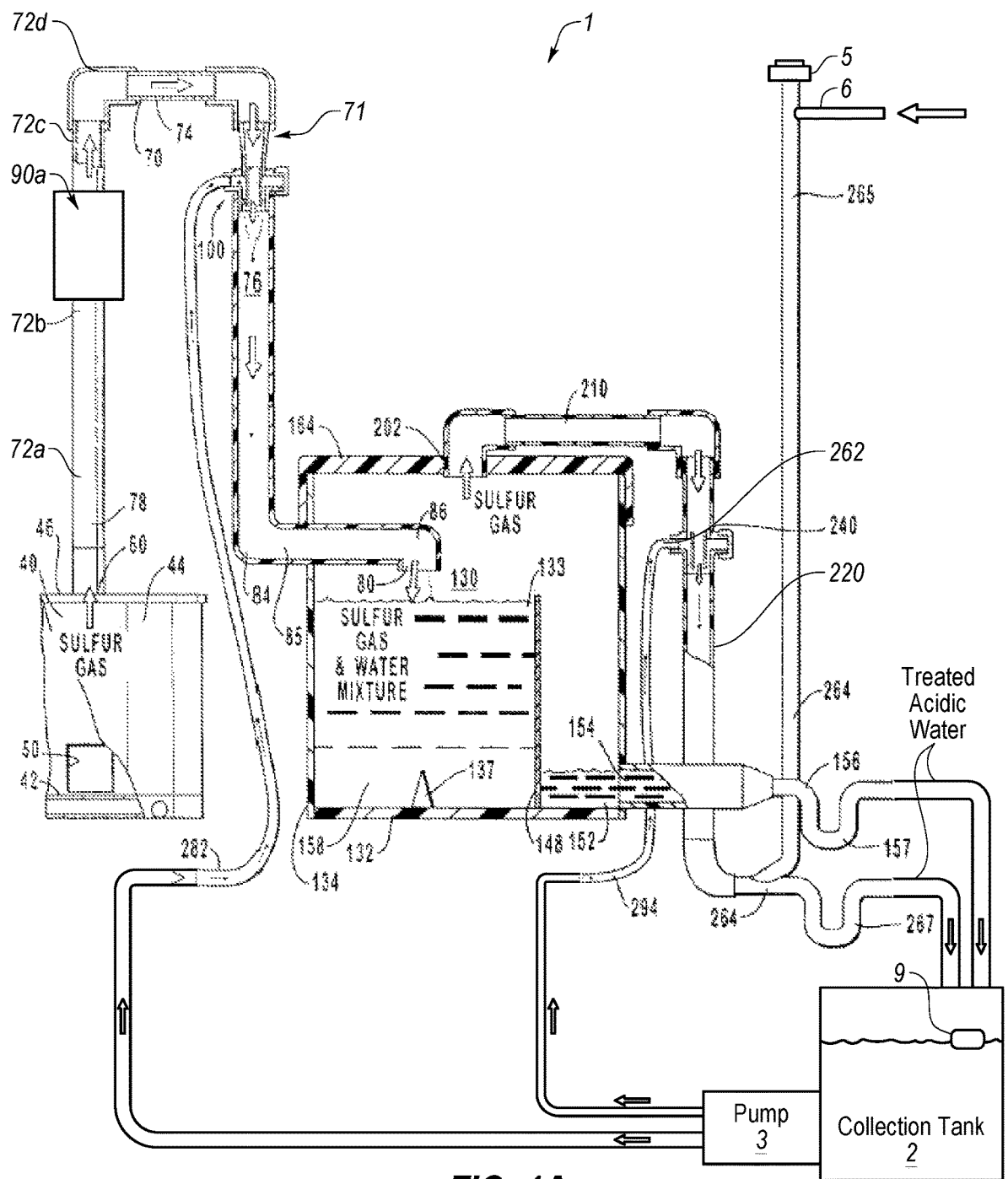
FIG. 1A is a cross-sectional illustration of an embodiment of a system that produces sulfurous acid.

FIGS. 1 and 1A illustrate an example of a sulfurous acid generating system 1 which generates sulfur dioxide gas and keeps the gas substantially contained and in contact with water for extended periods of time to generate sulfurous acid, thereby substantially eliminating any significant release of harmful sulfur dioxide gas from the system 1. However, it should be recognized that the features of the system can be modified, such as shown in the other figures. As shown in FIG. 1, the system can include a sulfur hopper 20, a burn chamber 40, an exhaust gas pipeline or first conduit 70, a mixing tank 130, and an exhaust conduit 210. The principle elements are mounted on a platform 10 to facilitate transport.

The sulfur hopper 20 can include an enclosure 24 with a top surface 26. The top surface 26 defines a closeable aperture, not shown, and thereby top surface 26 can be a lid. Enclosure 24 may be of any geometric shape; cylindrical is shown, rectangular may also be employed. Surface 26 of enclosure 24 can include a closeable aperture of sufficient diameter and shape to allow sulfur to be loaded into the hopper 20. The enclosure 24 defines a hopper outlet 30. The hopper 20 is configured such that sulfur in the hopper 20 is directed toward the hopper outlet 30 by the pull of gravity. The hopper outlet 30 allows sulfur to pass through and out of the hopper 20.

An optional passageway conduit 36 communicates between the hopper outlet 30 and a burn chamber inlet 50 of the burn chamber 40. While hopper outlet 30 is shown to be ported into the bottom of the burn chamber 40, the burn chamber inlet 50 can be at the middle of the side, top of the side, or into the top of the burn chamber 40.

In an optional embodiment, enclosure 24 may include a rocker arm 23 mounted external of enclosure 24. Rocker arm 23 is capable of being moved back and forth as shown by the arrow under the number 23. Connected to substantially vertical rocker arm 23, and extending internal to enclosure 24, is bar 25 having substantially upward extending fingers 27. Fingers 27 extend upward into the sulfur supply such that rocker arm 23 can be manipulated back and forth, thereby manipulating or raking fingers 27 back and forth to break up agglomerations of sulfur that may occur in hopper 20. This allows for stirring or moving the sulfur supply so that it does not get lodged in the hopper 20. A mechanical system can be coupled to the rocker arm 23 to facilitate rocking of the sulfur in the hopper 20. The enclosure 24 may have a sight window 212 that allows the level of sulfur to be observed, and to allow observation of agglomerations of sulfur so that an operator can operate the rocker arm to break up the sulfur for flow to the burn chamber 40.

The burn chamber 40 can include a floor member 42, a chamber sidewall 44 and a roof member 46. The floor member 42 defines a perimeter and the floor member 42 can be removably attached to the chamber sidewall 44. The roof member 46 is secured to the chamber sidewall 44, the chamber sidewall 44 supporting the roof member 46. The roof member 46 can also be or include a removable lid. An ignition inlet 52 defined by the roof member 46 has a removably attached ignition inlet cover 54. An air inlet 56 defined by the chamber sidewall 44 has a removably attached air inlet cover 58. However, the air inlet 56 may include an automated valve that can open and close in response to a system controller. The air inlet 56 is positioned substantially opposite to the burn chamber inlet 50 and may enter the chamber sidewall 44 tangentially or at the bottom, middle or top of the burn chamber 40. An exhaust opening 60 in the burn chamber 40 is defined by the roof member 46.

Sulfur supplied to the burn chamber 40 through the burn chamber inlet 50 can be united through the ignition inlet 52. The air inlet 56 allows oxygen, necessary for the combustion process, to enter into the burn chamber 40, and thus permits regulation of the rate of combustion. The exhaust opening 60 allows the sulfur dioxide gas to pass up through the exhaust opening 60 and into the exhaust gas or first conduit pipeline 70.

The exhaust gas pipeline or first conduit 70 has two ends, the first end 78 (e.g., at the lower column section) communicating with the exhaust opening 60, the second end 71 terminating at a third conduit 76. The gas pipeline or first conduit 70 may comprise an ascending pipe 72 having the lower column section 72a, middle column section 72b, and upper column section 72c that turns at the bend 72d to a transverse pipe 74. The ascending pipe 72 may communicate with the transverse pipe 74 by means of a first 90 degree elbow joint at the bend 72d.

Figure 1B:
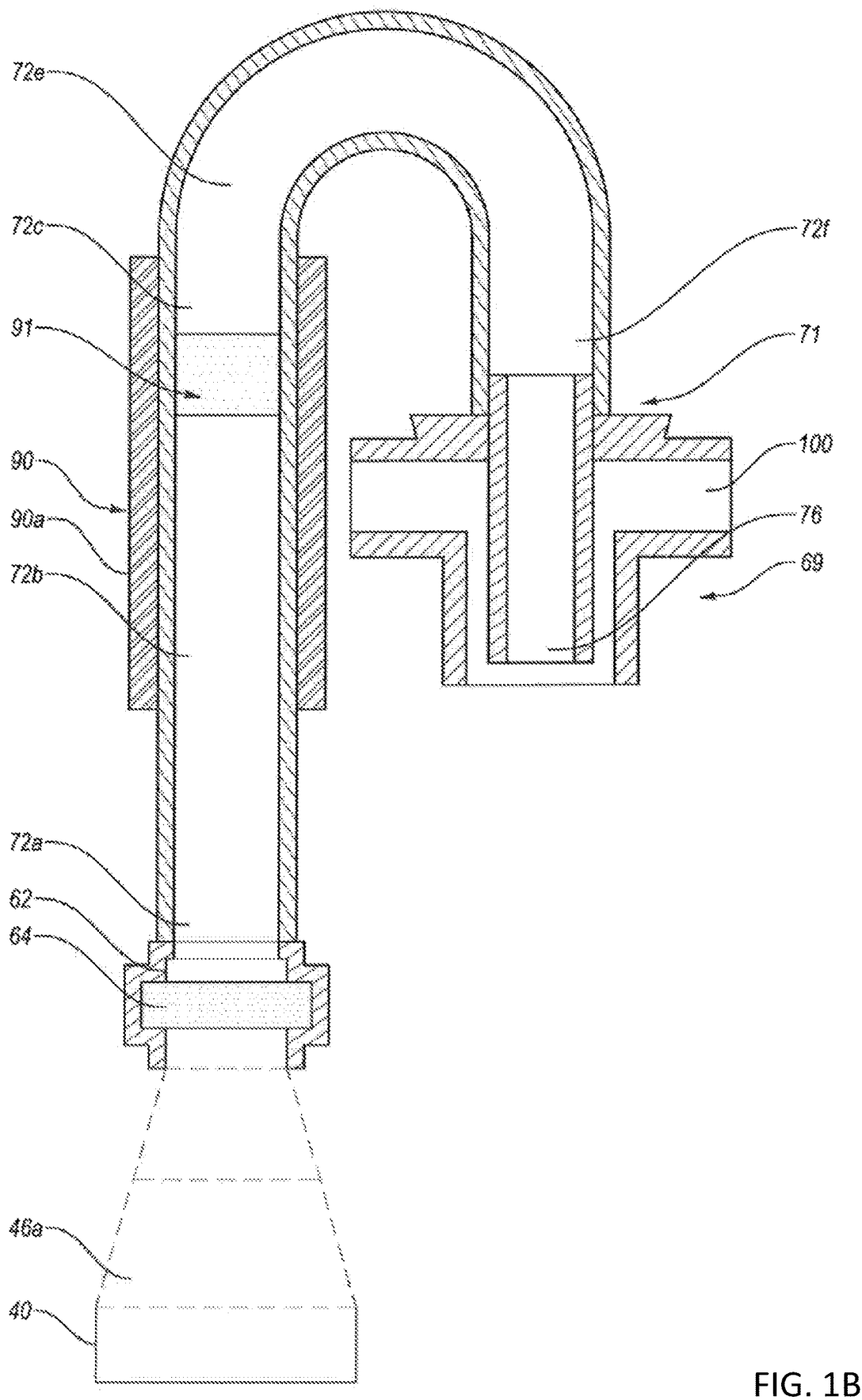
FIG. 1B is a cross-sectional illustration of an exhaust pipe in a candy cane configuration from a sulfur burner of a system that produces sulfurous acid.

However, FIG. 1B is a cross-sectional profile that illustrates another embodiment of the ascending pipe, transverse pipe and second end 71, which be combined and configured as a shape of a candy cane 69. As shown, the burn chamber 40 has an exhaust gas outlet that couples to the candy cane 69 by being coupled to the ascending pipe 72 of the candy cane 69. The coupling can be direct or indirectly, such as through a cone 46a and/or deflector 62. The ascending pipe 72 can be configured substantially as any ascending pipe described herein or known in the art. The ascending pipe 72 has the lower column section 72a, middle column section 72b, and upper column section 72c that turns at the bend 72e to a down pipe 72f. Here, the bend 72e is shown with a 180 degree turn. However, the turn can be less than or more than 180 degrees, and higher than 90 degrees. That is, the bend 72e is a full bend section between the upper column section 72c and the down pipe 72f without a straight section or transverse pipe, and thereby bend 72e has constant curvature between the upper column section 72c and down pipe 72f. The candy cane 69 can have various dimensions and curvatures. The second end 71 of the candy cane 69 is coupled with the venturi pump 100. The candy cane includes the secondary burn chamber 91, which can be a chamber in the pipe 72 or a region thereof defined by an increased temperature compared to piping before or piping after the secondary burn chamber 91.

Figure 9:
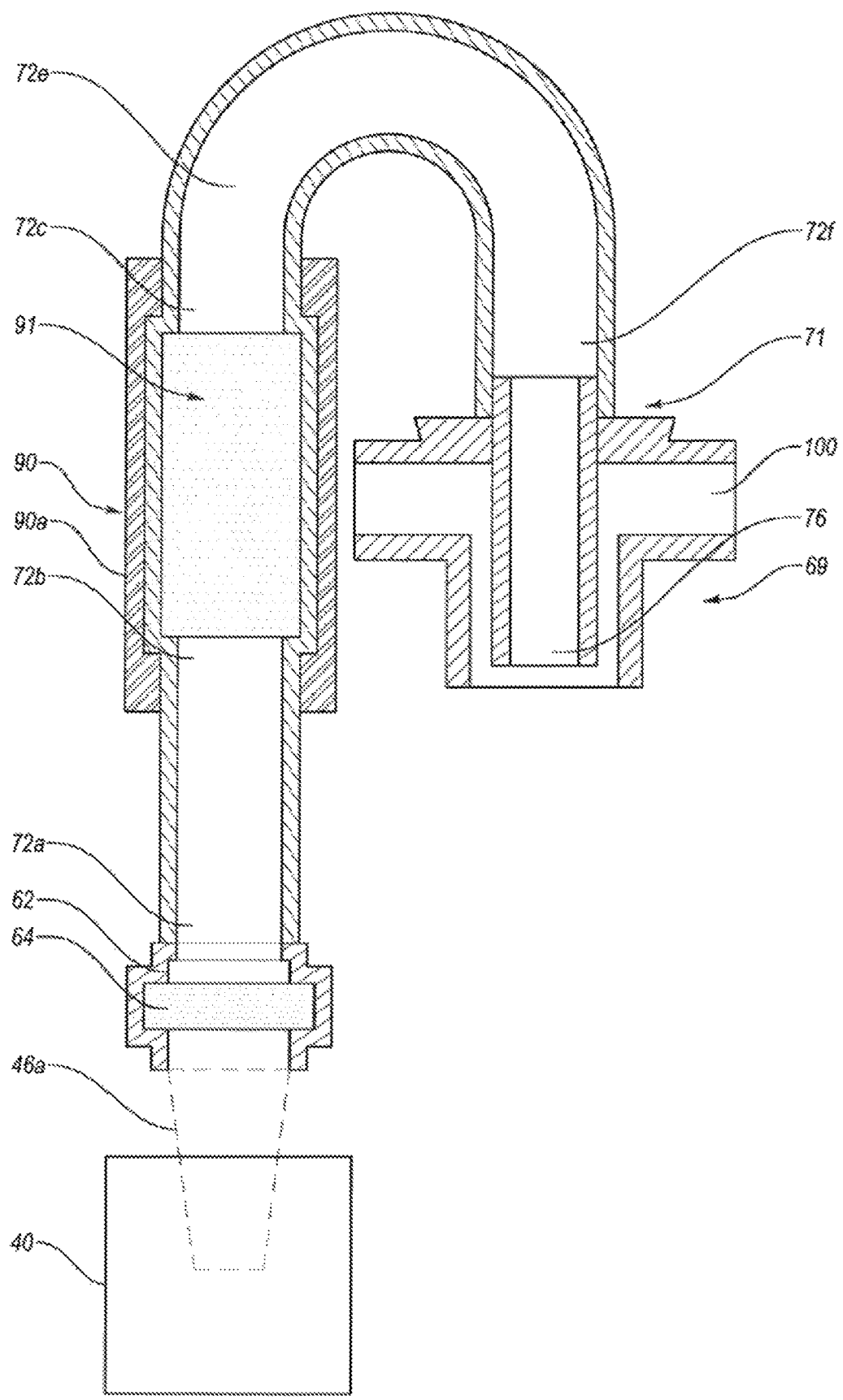
FIG. 9 is a cross-sectional illustration of an exhaust pipe in a candy cane configuration having a secondary burn chamber from a sulfur burner of a system that produces sulfurous acid.

FIG. 9 shows is a cross-sectional profile that illustrates a secondary burn chamber 91 that has a cross-sectional dimension that is larger than the cross-sectional dimension of the ascending pipe 72. Also shown is an inverted conical connector 46b that has a narrow end inserted into the burn chamber 40 and wide end attached to the deflector 62. The narrow end can be inserted at any depth into the burn chamber from 2 cm to 10 cm, and option to substantially the base of the burn chamber 40 while leaving a gap to allow exhaust to flow into the inverted conical connector 46b.

Optionally, a deflector 62 couples the burn chamber 40 to the ascending pipe 72. The deflector 62 can have a deflecting member 64 that deflects or diffuses the exhaust gas from the burn chamber 40, and can be used to regulate exhaust flow rate. The deflector 62 can be configured as any member that functions as a vortex breaker that breaks up the vortex of exhaust gas from the burner 40. The deflecting member 64 can include a solid plate so that the exhaust gas passes around before traveling up the pipe 72. Alternatively, the deflecting member 64 can be baffles. Alternatively, the deflecting member 64 can be a plate with holes or a mesh (e.g., metallic mesh) that allows the exhaust gas to pass through the holes. In any event, the deflector 62 can break the vortex and regulate the flow of exhaust gas. The deflector 62 may include mechanical parts that allow the aperture or collection of apertures (e.g., mesh) cross-sectional area to be controlled to be larger for more flow or smaller for less flow in order to control the flow rate. Such a deflector 62 may be controlled by a computer controller of the system 1.

Placing a deflector 62 (e.g., vortex breaker, or metal mesh) suspended inside the burn chamber or at or over or adjacent to the exhaust opening 60 and at the mouth or inlet of the candy cane 69 can improve the amount of mixing of sulfur and oxygen, both in the burn chamber and in the candy cane 69. The deflector 62 increases the amount of time before sulfur and oxygen rise up the candy cane 69 into the venturi pump, and typically reduces the velocity of exhaust gas moving through the candy cane 69. Also, the deflector 62 increases the surface area for mixing sulfur and oxygen in the burn chamber 40.

In one embodiment, the length of the ascending pipe 72 can be modulated to produce the secondary burn chamber 91. It has been found that longer candy canes 69 can increase the residence time of the exhaust gas and produce the secondary burn chamber 91. Longer ascending pipe 72 or candy cane 69 will allow more time for the sulfur to burn. Temperatures in the candy cane 69 can drop to 300 degrees F. (149 degrees C.) or less prior to exiting the candy cane 69. Optimally, temperatures on the candy cane are 300-380 degrees F. (e.g., 149-193 degrees C.) in the first 6 inches (15.24 cm) of the candy cane 69 just after leaving the burn chamber 40. Optimally, in the next 18 inches (2532 cm) of cane length temperature can increase due to secondary burning to anywhere from 450-1200 degrees F. (232-649 degrees C.). However, in some instances the secondary burn chamber can form or have a temperature as low as 400 degrees F. (204 degrees C.), or a temperature higher than in a region between the secondary burn chamber and primary burn chamber. The higher the temperature, the greater amount of previously non-oxidized sulfur is being burned in the secondary burn chamber 91. Cooler temperatures indicate that less sulfur is burning. Typically after the first 24 inches (61 cm) of length, temperatures gradually cool as there is no more sulfur to oxidize. This creates a parabolic temperature profile in the candy cane 69. The cooler the exit temperature of the gas leaving the candy cane 69 and entering into the venturi pump 100, the better the mixing of the sulfur dioxide with water. Cooler exit temperatures after a high secondary burn temperature in the first 24 inches (61 cm) of the cane generally indicate that all of the sulfur was oxidized leading to high conversion rates of sulfur to $SO_2$ and sulfurous acid. These measurements and dimensions are for a candy cane 69 having a length of 80 inches (203 cm), and the percentage length can be determined.

In one embodiment, the diameter or cross-sectional dimension of the pipe 72 or candy cane 29 can be varied to modulate the second burn chamber 91. A narrower candy cane 69 (e.g., less than 3 inches or 7.62 cm) can mix sulfur and oxygen better than larger diameter candy canes 69 (e.g., greater than 3 inches or 7.62 cm). The 2 inch diameter pipe 72 mixed sulfur and oxygen better than 3 inch diameter pipe 72 resulting in 50% lower pH levels (e.g., more acidic) based in solution despite burning 25% less sulfur. Here, the burn efficiency was closer to 100% so less sulfur was used in the burn. for example, a 2 inch diameter candy cane 96 burning 30 lbs (13.6 kg) per hour and lowered the sulfurous acid to pH of 1.95, where a 3 inch candy cane 69 burning 40 lbs (18.1 kg) per hour resulted in sulfurous acid to pH of 2.2

Optionally, disposed about and secured to the ascending pipe 72 is secondary burn member 90 to prevent cooling of ascending pipe 72 which is hot when in use. The secondary burn member 90 is optional because the secondary burn chamber 91 can form with merely adjusting the flow rate of the exhaust gas in the ascending pipe 72. The secondary burn member 90 can be various entities that promote a secondary burn within the ascending pipe 72. For example, the secondary burn member 90 can be any entity that retains heat or increases heat, such as an active heating element, electrical heating element, insulator, or the like. In one aspect, the secondary burn member 90 is an insulator that retains heat in the ascending pipe 72. The secondary burn member 90 can be added to any of the ascending pipes 72 or candy cane 69 described herein so as to form the secondary burn chamber 91.

In one embodiment, adding insulation 90a to the pipe 72 above the burn chamber 40 can create a secondary burn chamber 91 in the ascending pipe 72 triggered by an increase in insulated pipe temperature. This secondary burn chamber 91 can be sufficiently: separated from the burn chamber 40 so that the burn chamber temperature is not affected by secondary chamber heat. If the primary burn chamber temperature gets too high, there can be excessive boiling of the sulfur and not enough oxygen to create the desired sulfur dioxide. The length of the insulation 90a depends on the air flow into the burn chamber 40. The desired temperature of the secondary burn chamber 91 is at or greater than 400 degrees F. (204 degrees C.), or about 450-1500 degrees F. (232-850 degrees C.), or 500 to 1200 degrees F. (260-649 degrees C.); or 600-1000 degrees F. (315-538 degrees C.); however, the temperature can be modulated as described herein. The sulfur dioxide gas can be in the secondary burn chamber 91 for approximately 0.3 seconds, 0.2-0.4 seconds, or 0.1-0.5 seconds.

The insulation 90a can have various parameters so long as it causes formation of the secondary burn chamber 91 in the ascending pipe 72 that is covered by the insulation 90a. The insulation 90a can be any standard hot pipe insulation that can withstand elevated temperatures that are described herein.

In practice, it was found that the secondary burn chamber 91 is formed during the process, and presented as the upper column section 72c is glowing red, such as a the temperatures described herein. Such temperatures can be accomplished by the insulation 90a and modulation of the operating parameters, such as exhaust flow rate.

In one aspect, the secondary burn chamber 91 can also be achieved by regulating the flow rate of exhaust gas from the burn chamber 40 through the ascending pipe 72, where a decrease in flow rate can improve the secondary burn. The flow rate of exhaust gas in the ascending pipe 72 can also be regulated by modulating the flow rate in the first venturi. The modulation of flow rate of the venturi will be described in more detail below. Alternatively, the modulation of the flow rate of exhaust gas in the ascending pipe 72 can be achieved by the deflector 62 having the deflecting member 64.

The secondary burn chamber 91 can operate because less than 100% (e.g., less than or about 60%) of the sulfur supply burns in the burn chamber 40. As such, sulfur particles can be entrapped by the exhaust from the burn chamber 40 and travel up into the ascending pipe 72, which is not favorable without the secondary burn chamber 91. The excess sulfur particles in the exhaust can cause problems for the process and piping, which is described herein. As such, implementing the secondary burn chamber 91 can burn the excess and unburned sulfur in the exhaust to cause improved sulfur burning and improved generation of sulfur dioxide in the exhaust flow. It has been found that the secondary burn chamber 91 can increase burn efficiency to about 100%.

The flow of exhaust gas in the ascending pipe 72, and thereby in the secondary burn chamber 91, can be between 20 and 400 gallons (e.g., 76 and 1514 liters) of exhaust per minute. However, modulating the exhaust flow rate to between 30 to about 350 gallons (e.g., about 114 to about 1325 liters) per minute, or 40 to about 300 gallons (e.g., about 151 to about 1135 liters) per minute, or 50 to about 250 gallons (e.g., about 189 to about 946 liters) per minute can improve the combustion to fuller combustion in the secondary burn chamber 91. Also, it should be recognized that the flow rate can be varied to any value of these ranges. Also, it should be recognized that larger systems may have flow rates higher than 400 gallons per minutes.

During the process, water is conducted through a second conduit 282 to a point at which the second conduit 282 couples with the first conduit 70 at a third conduit 76. The point can be a venturi pump 100. Third conduit 76 can include a co-directional flow means 100 (e.g., venturi pump) for bringing the sulfur dioxide gas in the first conduit 70 and substantially all the water in second conduit 282 into contained co-directional flow, whereby the sulfur dioxide gas and water are brought into contact with each other in the venturi pump 100.

Figure 1C:
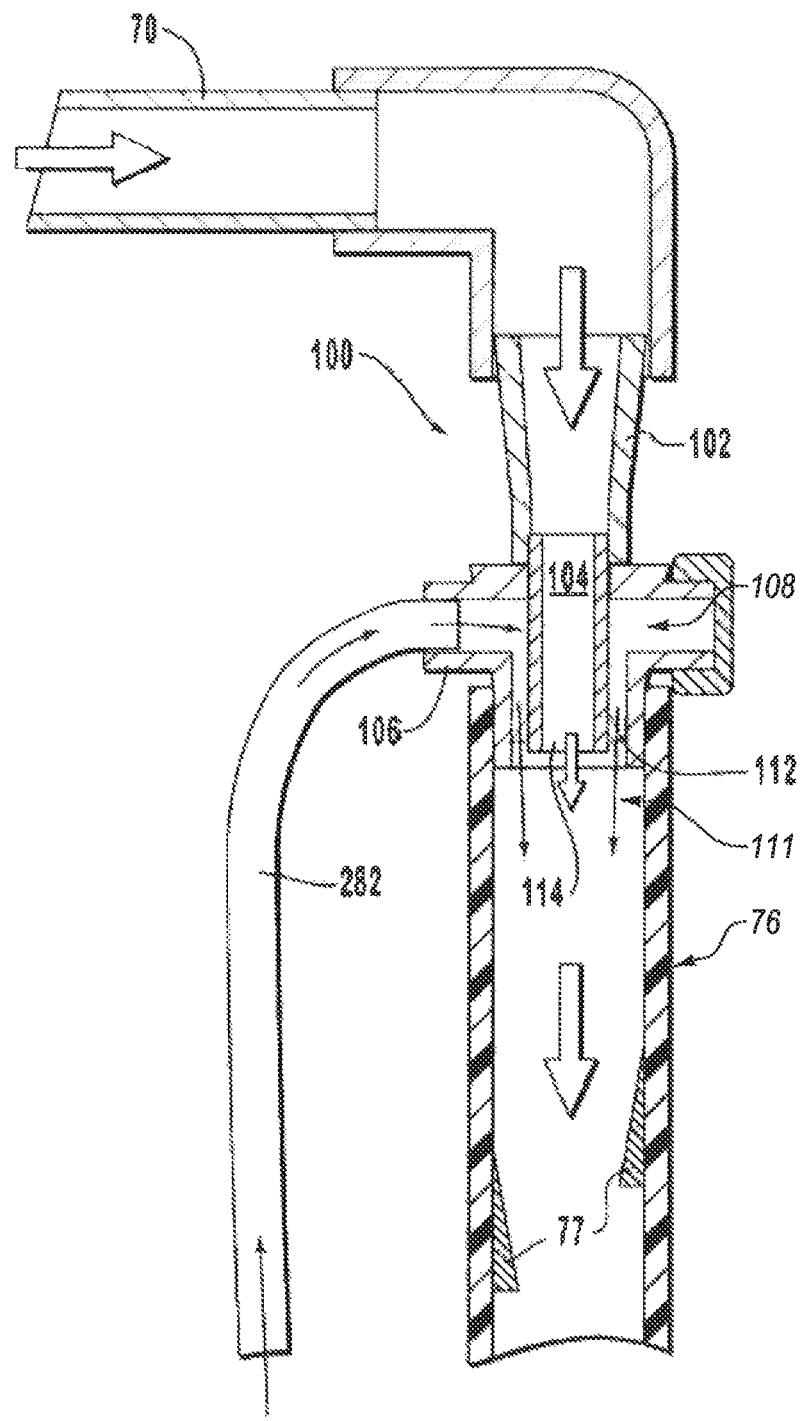
FIG. 1C is a cross-sectional illustration of an embodiment of a venturi pump of a system that produces sulfurous acid.

The co-directional flow means 100 (also referred to herein as venturi pump) shown in FIGS. 1A and 1C, includes a central body 102, the central body 102 defining a gas entry 104 and a sulfur dioxide gas exiting outlet 114. The central body 102 can include a secondary conduit inlet 106, a cooling ring outlet 108, an emitter 111 and an eductor 112. While central body 102 is shown as a reducer having a larger inlet and smaller outlet, the inlet and outlet can be the same size so that the central body is not a reducer. Also, the inlet may be smaller than the outlet in some instances. The eductor 112 generates an annular column of water to encircle sulfur dioxide gas exiting outlet 114. The water flow, thermal cooling and reaction are believed to assist in drawing sulfur dioxide gas from the burn chamber 40 into the exhaust gas pipeline 70 where the gas is brought into contact with water to create sulfurous acid. The venturi pump 100 works as is known, where the water flowing through inlet 106 can determine the exhaust flow rate inside the pipe 72. The exhaust flow rate inside the ascending pipe 72 can be modulated to improve the conditions of the secondary burn chamber 91. Where slowing the flow rate can improve the amount of sulfur that is burned to sulfur dioxide within the secondary burn chamber 91.

The venturi pump 100 allows water to be introduced into the third conduit 76 initially through a second conduit inlet 106. The water entering the venturi pumps 100 passes through the eductor 112 and, exits adjacent the sulfur dioxide gas outlet 114. The water enters the third conduit 76 and comes into contact with the sulfur dioxide gas exiting by surrounding the sulfur dioxide gas where the sulfur dioxide gas and water are contained in contact with each other. The water and sulfur dioxide gas react to form an acid of sulfur—sulfurous acid. This first contact containment portion of conduit 76 does not obstruct the flow of the sulfur dioxide gas. It is believed that a substantial portion of the sulfur dioxide gas will react with the water in this first contact containment area.

After the acid and any host water (hereafter "water/acid") and any remaining unreacted gas continue to flow through third conduit 76, the water/acid and unreacted sulfur dioxide gas are mixed and agitated to further facilitate reaction of the sulfur dioxide with the water/acid. Means for mixing and agitating the flow of water/acid and sulfur dioxide gas is accomplished in a number of ways. For example, mixing and agitating can be accomplished by changing the direction of the flow such as a bend 84 (FIG. 1A) in the third conduit 76. Another example includes placing an object 77, such as a baffle or tornado, inside the third conduit 76 to alter the flow pattern in the third conduit 76. This could entail a flow altering wedge, flange, bump or other member along the co-directional flow path in third conduit 76. By placing an object 77 in the flow path, a straight or substantially straight conduit may be employed. The distinction of this invention over the prior art is mixing and agitating the flow of water/acid and sulfur dioxide involving substantially all of the water of the system with sulfur dioxide gas in an open co-directionally flowing system. Another way to increase contact of the sulfur dioxide gas and water/acid is to include multiple venturi pumps 100 in sequence, with the outlet of one venturi pumps 100 being the inlet of the next venturi pumps 100. Any number of venturi pumps 100 can be in sequence, as described herein. One embodiment of the present invention can treat between 20 and 400 gallons of water per minute coursing through third conduit 76 being held in contained contact with the sulfur dioxide gas.

After the water/acid and sulfur dioxide gas have passed through an agitation and mixing portion of third conduit 76, the water/acid and unreacted sulfur dioxide gas are again contained in contact with each other to further facilitate reaction between the components to create an acid of sulfur. This is accomplished by means for containing the water/acid and sulfur dioxide gas in contact with each other. One embodiment is shown in FIG. 1A as a portion 85 of third conduit 76.

In one embodiment, additional means for mixing and agitating the co-directional flow of water/acid and sulfur dioxide gas is employed. One embodiment is illustrated as portion 86 of third conduit 76 in which again the directional flow of the water/acid and sulfur dioxide gas is directionally altered. In this way, the water/acid and sulfur dioxide gas are forced to mix and agitate, further facilitating reaction of the sulfur dioxide gas to further produce or concentrate an acid of sulfur.

Third conduit 76 also incorporates means for discharging the water/acid and unreacted sulfur dioxide gas before the various third conduits 76. One embodiment is shown in FIG. 1A as discharge opening 80 defined by third conduit 76. Discharge opening 80 is preferably positioned approximately in the center of the pooling section, described below. In one embodiment, discharge 80 is configured so as to direct the discharge of water/acid and unreacted sulfur dioxide gas downward into a submersion pool 158 without creating a back pressure. In other words, discharge 80 is sufficiently close to the surface 133 of the fluid in the submersion pool to cause unreacted sulfur dioxide gas to be forced into the submersion pool, but not below the surface of the fluid in the submersion pool, thereby maintaining the open nature of the system and to avoid creating back pressure in the system.

One embodiment of the present invention also utilizes a mixing tank 130 having a bottom 132, a tank sidewall 134, and a lid 164. While referred to as a mixing tank 130, it may well be considered a separation tank because the gas is separated from the liquid, or a collection tank to collect the acidic water. Tank 130 may also comprise a fluid dispersion member 137 to disperse churning sulfurous acid and sulfur dioxide gas throughout tank 130. Dispersion member 137 may have a conical shape or any other shape which facilitates dispersion, and may be a mechanical mixer. Also, the tank 130 can have a cooling jacket 160 to cool the liquid therein, where the decrease in temperature can enhance formation of sulfurous acid. An optional weir 148 may be attached on one side to the bottom member 132 and is attached on two sides to the tank sidewall 134. The weir 148 extends upwardly to a distance stopping below the discharge 80. The weir 148 divides the mixing tank 130 into a submersion pool 158 and an outlet section 152. The third conduit 76 penetrates the tank sidewall 134 at a point below the lid 164. An outlet aperture 154 is positioned in the tank sidewall 134 near the bottom member 132 in the discharge section. The outlet aperture 154 is connected to a drainage pipe 156. Drainage pipe 156 is adapted with a u-trap 157. U-trap 157 acts as a means to force levels of undissolved gas of sulfur dioxide gas back into chamber 130 to exit through lid 164 into vent conduit 210. The treated acidic water from drainage pipe 156 can be provided to a collection tank and then pumped back to the venturi pump 100 and/or venturi pump 240 as well as any other additional venturi pumps.

FIG. 1A shows an embodiment of the system that shows recycling from the discharge 264 and drainage pipe 156 to a common collection tank 2. The common collection tank 2 then provides the treated acidic water to a pump 3 that pumps the treated acidic water to the venturi pump 100 and venturi pump 240 as well as an additional venturi pumps. Also, while no outlet is shown, it is well within the skill in the art to have an outlet anywhere sulfurous acid is present, such as in tanks (e.g., collection tank 2) or from 166 and 264, or anywhere a pH sensor identifies the desired pH, and the system can include valves and outlets for such withdrawal.

As sulfurous acid flows out of the third conduit 76, the weir 148 dams the acid coming into the mixing tank 130 creating a churning submersion pool 158 of sulfurous acid. Sulfur dioxide gas carried by but not yet reacted in the sulfurous acid is carried into submersion pool of acid 158 because of the proximity of the discharge 80 to the surface 133 of the submersion pool of acid 158. The carried gas is submerged in the churning submersion pool of acid 158. The suspended gas is momentarily churned in contact with acid in submersion pool of acid 158 to further concentrate the acid. As unreacted gas rises up through the pool, the unreacted gas is held in contact with water and further reacts to further form concentrate sulfurous acid. The combination of the discharge 80 and its close proximity to the surface 133 of submersion pool of acid 158 creates a means for facilitating and maintaining the submersion of unreacted sulfur dioxide gas discharged from the third conduit 76 into the submersion pool of sulfurous acid to substantially reduce the separation of unreacted sulfur dioxide gas from contact with the sulfurous acid to promote further reaction of the sulfur dioxide gas in the sulfurous acid in an open system without subjecting the sulfur dioxide gas discharged from the third conduit to back pressure or system pressure.

As sulfurous acid enters the mixing tank 130 from the third conduit 76, the level of the submersion pool 158 of sulfurous acid rises until the acid spills over the weir 148 into the outlet section 152. Sulfurous acid and sulfur dioxide gas flow out of the mixing tank 130 into the drainage pipe 156. Drainage pipe 156 is provided with a submersion zone in the u-trap 157 in which sulfur dioxide gas is again mixed into the sulfurous acid and which prevents sulfur dioxide gas from exiting the drainage pipe 156 in any significant amount.

Figure 1D:
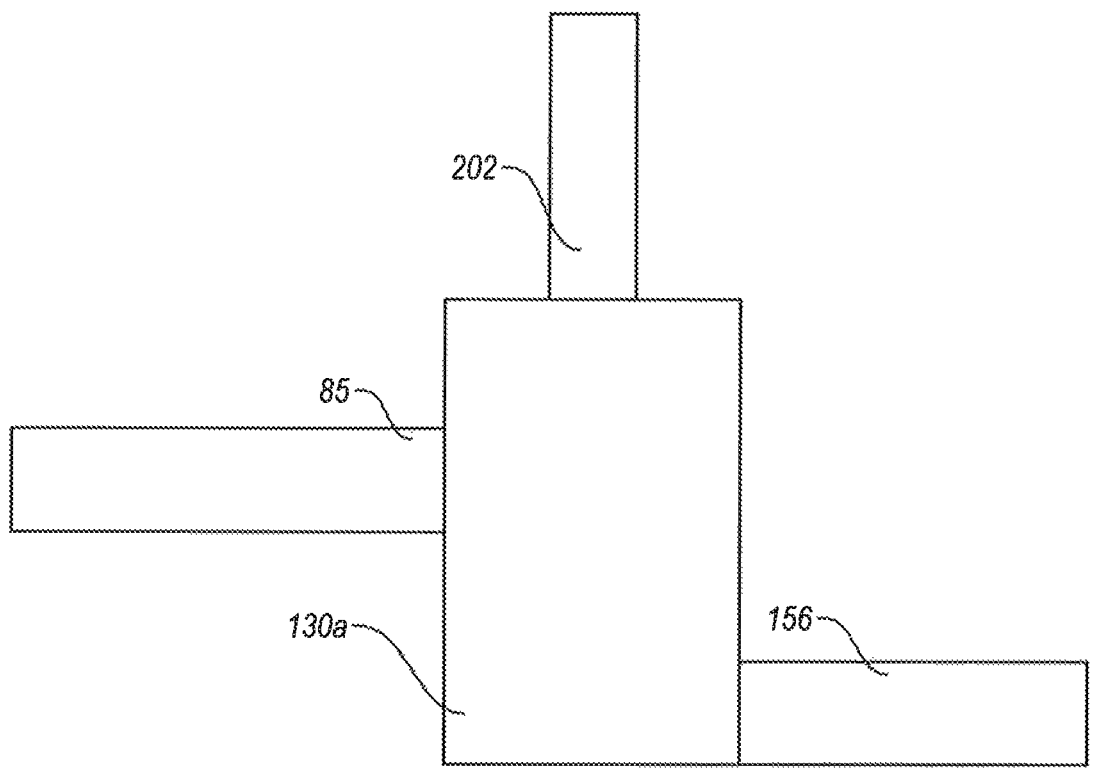
FIG. 1D is a schematic representation of a mixing tank that mixes sulfurous acid and evolves sulfur dioxide from the sulfurous acid.
Figure 1E:
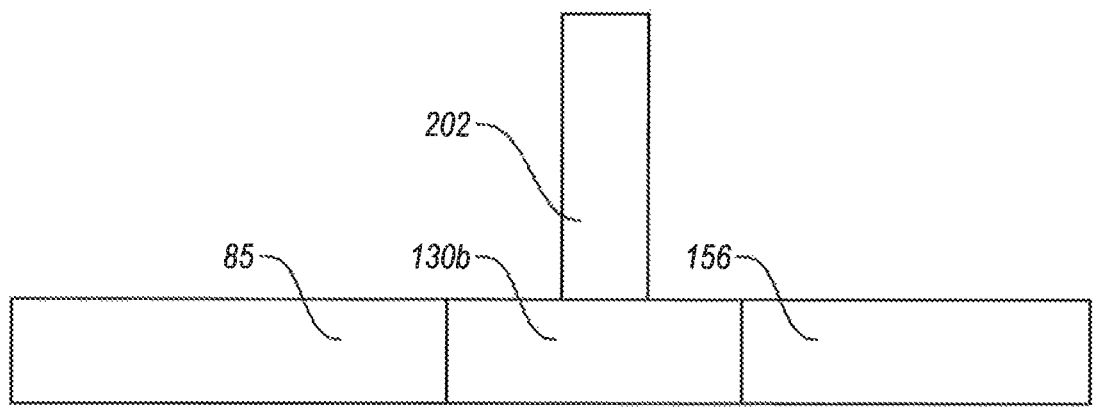
FIG. 1E is a schematic representation of a mixing tube that mixes sulfurous acid and evolves sulfur dioxide from the sulfurous acid.

In one embodiment, the tank 130 can be configured without a weir. In such an embodiment, gases go out exhaust vent 202 and the liquid goes out aperture 154 to drainage pipe 156. Such embodiments are shown in FIG. 1D with the traditional tank 130a without a weir. FIG. 1E shows a pipe tank 130b. Besides the lack of a weir, these tanks operate substantially as described in connection to FIGS. 1 and 1A. The tank 130a can be operated so that the flow is above or below the water level line, such as an open or closed system. Tank 130b can be operated so that the flow is continuous. Back pressure can be avoided in both by drawing gas through exhaust vent 202.

Any free floating sulfur dioxide gas in mixing tank 130 rises up to the lid 164. The lid 164 defines an exhaust vent 202. Exhaust vent 202 may be coupled with an exhaust vent conduit 210. The exhaust vent conduit 210 has a first end which couples with the exhaust vent 202 and a second end which terminates at a fourth conduit 220. The exhaust vent conduit 210 may consist of a length of pipe between vent 202 and the fourth conduit 220. The fourth conduit 220 comprises auxiliary means 240 (e.g., auxiliary venturi pump) for bringing sulfur dioxide gas in the exhaust vent conduit 210 and substantially all the water in a supplemental water conduit hose 294 into contained, co-directional whereby remaining sulfur dioxide gas and water are brought into contact with each other. The auxiliary means 240 (also referred to herein as a venturi pump) can be configured as the venturi pump 100.

Water enters the auxiliary means 240 through the supplemental water conduit 294 at supplemental water conduit inlet. The water courses through the water eductor as discussed earlier as to the co-directional means. The water eductor draws any free floating sulfur dioxide gas into the exhaust vent conduit 210. Water and sulfur dioxide gas are brought into contact with each other in fourth conduit 220 by surrounding the gas with water. The water and gas are contained in contact with each other as the gas and water flow down through fourth conduit 220 to react and form an acid of sulfur. This contact containment area does not obstruct the flow of the sulfur dioxide gas. Substantially all of the sulfur dioxide gas in exhaust vent conduit 210 reacts with the water in this contact containment area.

In fourth conduit 220, the water/acid and unreacted or undissolved sulfur dioxide gas also experience one or more agitation and mixing episodes. For example, as water reenters fourth conduit 220 at inlet 262, the flow of water/acid and sulfur dioxide gas is mixed and agitated. The water/acid and sulfur dioxide gas are again contained in contact with each other thereafter. Another similar mixing and agitating episode occurs when the directional flow of the water/acid and sulfur dioxide gas is altered near discharge 264. As a result, like the water/acid and sulfur dioxide gas in the third conduit 76, the water/acid and sulfur dioxide gas in fourth conduit 220 may be subject to one or more contact containment portions and on or move agitation and mixing portions. The fourth conduit may have a u-trap 267. U-trap 267 acts as means to cause bubbles of unabsorbed diatomic nitrogen gas to be held on the upstream side of u-trap 267. Discharge 264 is also configured with a vent stack 265. Remaining diatomic nitrogen gas in the system is permitted to escape the system through vent stack 265. Operation of the system reveals that little, if any, sulfur dioxide escapes the system. It is believed that gas that is escaping the system is harmless diatomic nitrogen. This configuration of a sulfur acid generator eliminates the structure, expense and use of a counter current absorption tower of the prior art. The treated acidic water from discharge 264 can be provided to a collection tank and then pumped back to the venturi pump 100 and/or venturi pump 240 as well as any other additional venturi pumps. As such, the treated acidic water from the discharge 256 can be combined with the treated acidic water from drainage pipe 156, where both can be provided to a collection tank 2 and then pumped back to the venturi pump 100 and/or venturi pump 240 as well as any other additional venturi pumps.

In one embodiment, with reference to FIG. 1, the vent stack 265 can include a gas flow reducer 5. The gas flow reducer 5 can completely inhibit gas flow out the top of the chimney so as to function as a cap. However, gas pressure may build to cause problems, and thereby the gas flow reducer 5 can be configure to reduce the gas flow or to inhibit gas flow until reaching a certain pressure. The gas flow reducer 5 can be configured as a cap with small holes to reduce gas flow out of the vent stack 265. The gas flow reducer 5 can also be configured with a pressure release valve that releases gas when the pressure in the chimney reaches a predetermined. The vent stack 265 may also include a water inlet 6, which can supply untreated water or treated sulfurous acid water to the vent stack 265. This can be used to scrub the exhaust and increase efficiency of sulfurous acid production from the system 1.

An embodiment of the system can be modified as described herein and illustrated in FIG. 1A. As such, the outlet of treated acidic water, such as from 156 and 264 can be emptied into a common tank (e.g., collection tank 2), and then pumped with one or more pumps 3 back to the venturi pump, such as venturi pump 100 and venturi pump 240 as well as any additional venturi, such as the third, fourth, fifth, or more venturi pumps.

FIG. 1 shows a primary pump 280 supplying water through a primary hose 282 to the secondary conduit water inlet 106 at venturi pump 100. The primary hose 282 can include a sensor 283, which can be a pH and/or flow rate sensor. In FIG. 1A, a supplemental or secondary pump 3 supplies water to venturi pump 240 through a supplemental water conduit hose 294. It will be appreciated that any pump capable of delivering sufficient water to the system may be utilized and the pump may be powered by any source sufficient to run the pump. A single pump with the appropriate valves may be used or several pumps may be used. It is also contemplated that no pump is necessary at all if an elevated water tank is employed to provide sufficient water flow to the system or if present water systems provide sufficient water pressure and flow.

Additionally, it has been found that the depth of insertion of the discharge end (e.g., the second end) of the candy cane beyond the venturi plate can dramatically influence buildup of solid sulfur in the machine. Too little or too much insertion can have detrimental effects on this. Reference is made to FIG. 1C, which shows the sulfur dioxide gas outlet 114 in the venturi pump 100 at a location relative to the secondary conduit water inlet 106 and cooling ring outlet 108. The distance the gas exiting outlet 114 penetrates into the venturi pump 100 can determine the amount of sulfur buildup. It has been found that inserting the gas entry outlet 104 into the venturi pump into or past the secondary conduit water inlet 106 and/or cooling ring outlet 108 can have a variable insertion dimension, where the insertion dimension is the distance from the top of the cooling ring outlet 108 to the bottom tip of the gas entry outlet 104. Accordingly, an optimal insertion dimension can be determined by an iterative optimization process. A first insertion dimension is set and the system 1 is operated, and then the amount of solid sulfur buildup in the system is determined. Next, a second insertion dimension (e.g., shorter or longer than first insertion dimension) is set and the system is operated, and then the amount of solid sulfur buildup in the system is determined. As a note, each insertion dimension setting can be studied in one, two, three, or more different operations so that an average amount of solid sulfur buildup can be obtained. The sulfur buildup of the first insertion dimension is then compared with the second insertion dimension. If the amount of sulfur buildup for the second dimension is less than the first dimension, then the second insertion dimension can be considered better than the first dimension. Also, a third insertion dimension (e.g., shorter or longer than first insertion dimension and opposite of the second dimension so one is shorter and one is longer than the first insertion dimension) is set and the system is operated, and their the amount of solid sulfur buildup in the system is determined. The sulfur buildup of the third insertion dimension is compared to the first insertion dimension and optionally to the second insertion dimension. If the sulfur buildup is less in the third insertion dimension, then the third dimension can be considered optimal. This process can be performed to provide an indication of whether or not the insertion dimension needs to increase or decrease to be optimized. The process can be performed in any number of iterations, any of which increase or decrease the insertion dimension, until an optimal insertion dimension is found that results in less sulfur buildup. The optimal insertion dimension can then be used. For example, using a venturi pump 100, it was found that the optimal insertion dimension to be about 0.1 inches (0.254 cm) to about 3 inches (7.62 cm), or about 0.2 inches (508 cm) to about 2.5 inches (6.35 cm), or about 0.25 inches (0.635 cm) to about 2 inches (508 cm).

In one embodiment, the configuration of the insulation 90a for the secondary burn chamber 91 can also be optimized through an iterative process. Initially, a first type of insulator material is chosen and configured with a first length and first thickness, and then the system 1 is operated and the formation, location, size, and/or temperature of the secondary burn chamber 91 is determined. Then the location of the insulator material is changed upwardly and/or downwardly, and the system 1 is operated and the formation, location, size, and/or temperature of the secondary burn chamber 91 is determined. This can determine the optimal location. Then, the size of the insulator can be varied, and the system 1 is operated and the formation, location, size, and/or temperature of the secondary burn chamber 91 is determined. Then, the thickness can be modulated, and the system is operated again. These iterations can provide information for optimizing the secondary burn chamber 91. Then, a second type of insulator material, more or less insulating, is formed at the first length and thickness and placed at the same location. All of these iterative processes can be performed until the configuration optimal insulator for forming the secondary burn chamber 91 is identified.

Figure 2:
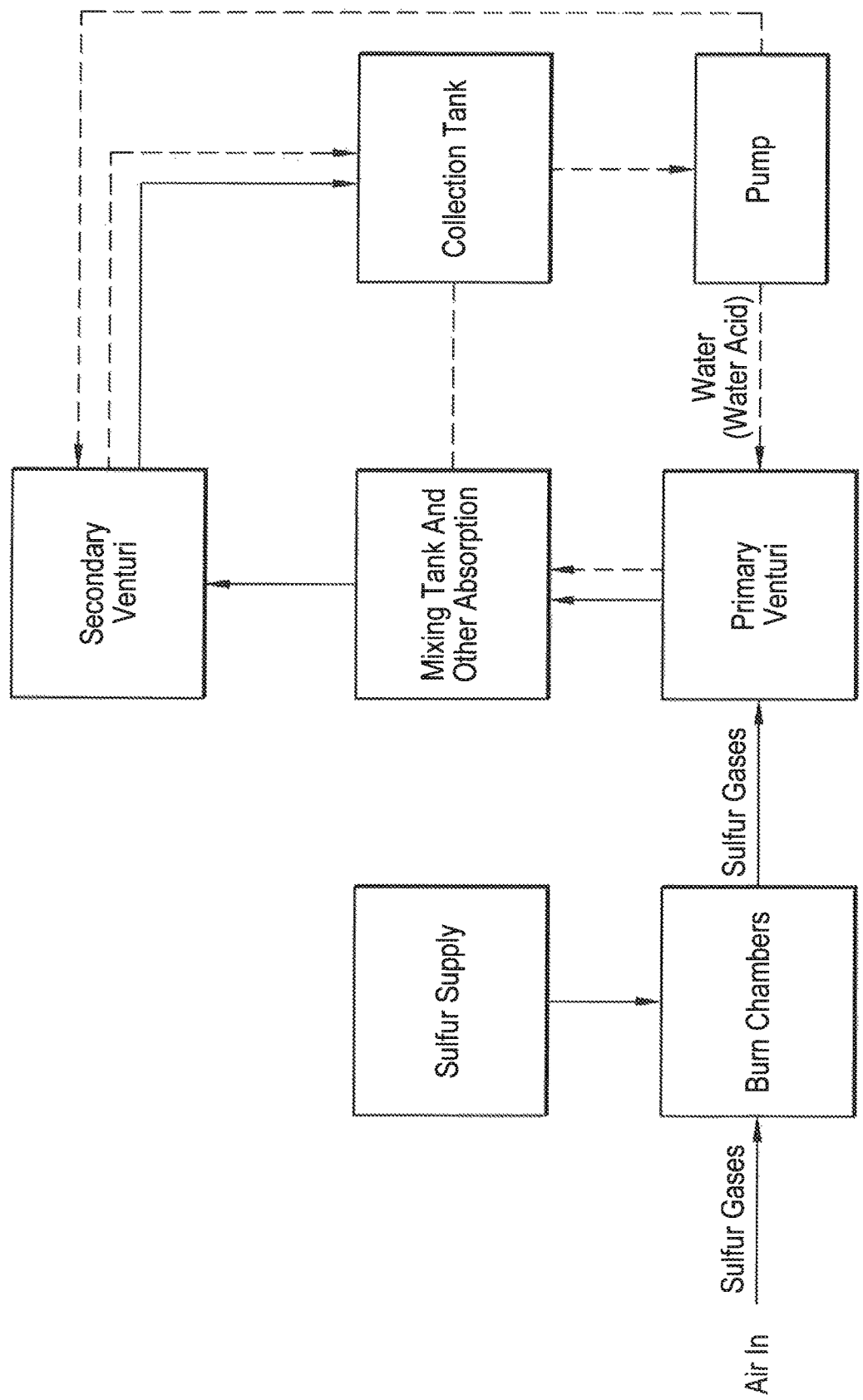
FIG. 2 is a schematic representation of a system configuration that recycles aqueous sulfurous acid to venturi pumps to improve efficiency of sulfurous acid production.

In one embodiment, the system and methods can be operated so as to increase concentration of sulfurous acid in the product. The arrangement of the system and performance of the method can be reviewed in FIG. 2, which shows the sulfur supply going into the burn chamber with air, and the sulfur gas going into the primary venturi where the sulfur gas mixes with the water/acid, and the sulfur gas and water/acid goes into the mixing tank, and then the water/acid is pumped back to the inlet of the primary venturi. As such, the water/acid into the primary venturi initially is pure water, but as the system operates, the liquid into the venturi becomes more acidic with sulfurous acid. Also, the gas from the mixing tank goes to the secondary venturi, and liquid from mixing tank goes to a collection tank. The pump pumps the water (acid water) from the collection tank to the primary venturi pump and secondary venturi pump as well as an additional venturi pumps. The secondary venturi pump provides the liquid and gas to the collection tank. Thus, the method of concentrating sulfurous acid can include taking the effluent of the mixing tank and using a pump to pump the contents of the mixing tank to the liquid inlet of the primary venturi. This recirculation continues until the desire pH is reached. The desired pH can be calculated based on the amount of sulfur burned or it can be measured using a pH sensor.

Figure 3:
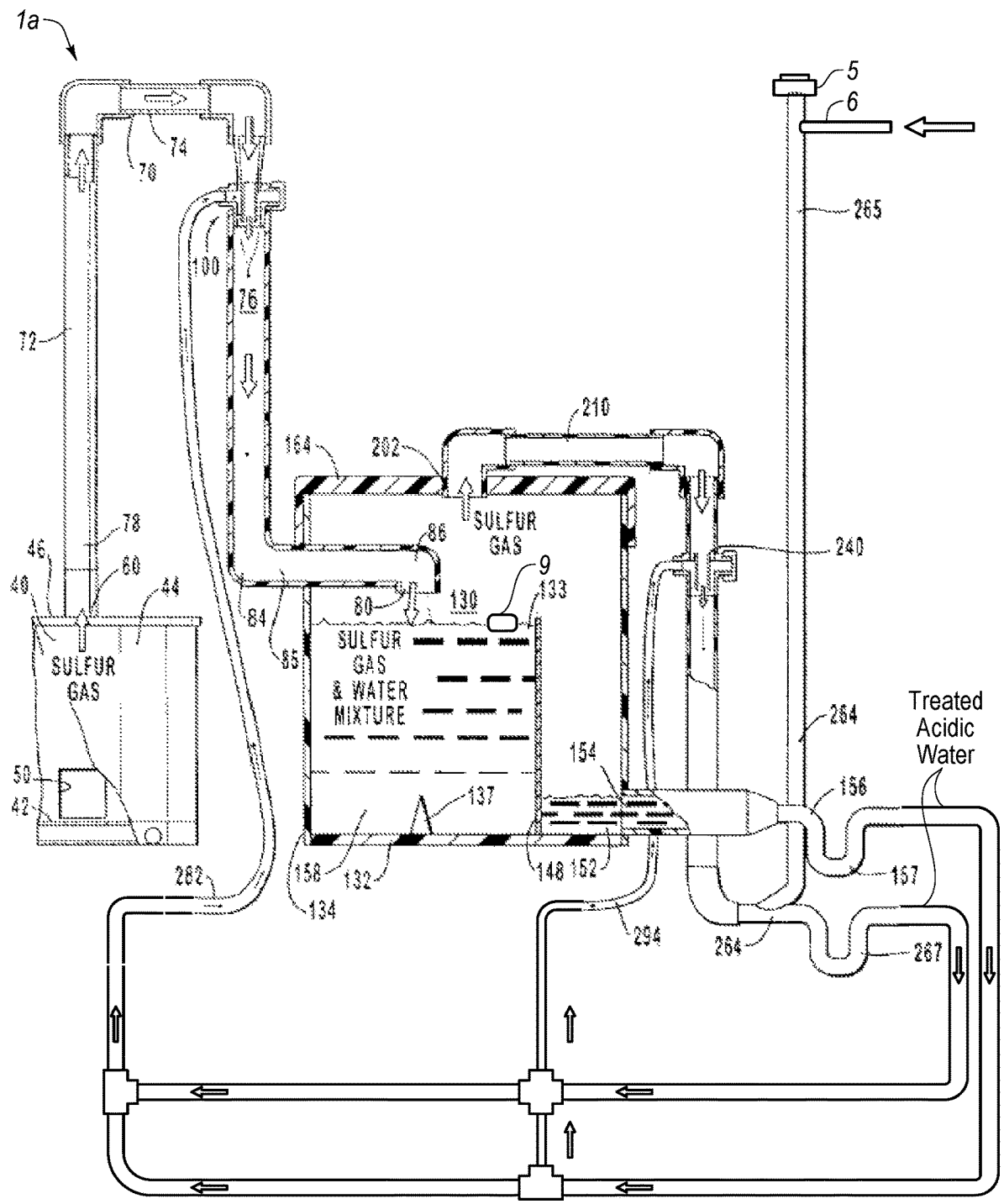
FIG. 3 illustrates a system configuration that recycles aqueous sulfurous acid to venturi pumps to improve efficiency of sulfurous acid production.

FIG. 3 shows an example of a system 1*a* that has a feedback loop for water/acid to be fed back to the primary venturi. In one option, the outlet from drainage pipe 156 is directed to second conduit 282, and thereby the second conduit 282 pumps the water/acid to the first venturi pump 100. In another option, the outlet of the discharge 264 can be directed to the second conduit 282, and thereby the second conduit 282 pumps the water/acid to the first venturi pump 100. As such, the liquid initially mixed with the sulfur dioxide in the exhaust at the venturi pump 100 has some sulfurous acid. It should be noted that the second conduit 282 can receive water/acid from drainage pipe 156 and/or the outlet of the discharge 264. The treated acidic water from either outlet can be provided to a common collection tank and then pumped to the venturi pumps (100 and 240 as well as others). Also, while no outlet is shown, it is well within the skill in the art to have an outlet anywhere sulfurous acid is present, such as in tanks (e.g., collection tank 2) or from 166 and 264, or anywhere a pH sensor identities the desired pH, and the system can include valves and outlets for such withdrawal. The junctions between 166, 264 and 282, 294 can be valves to control flow and may include outputs for withdrawal.

Additionally or alternatively, the outlet from drainage pipe 156 is directed to supplemental water conduit 294, and thereby the supplemental water conduit 294 pumps the water/acid to the auxiliary means 240 (e.g., auxiliary venturi pump). In another option, the outlet of the discharge 264 can be directed to the supplemental water conduit 294, and thereby the supplemental water conduit 294 pumps the water/acid to the auxiliary means 240 (e.g., auxiliary venturi pump). As such, the liquid initially mixed with the sulfur dioxide at the auxiliary means 240 (e.g., auxiliary venturi pump) has some sulfurous acid. It should be noted that supplemental water conduit 294 can receive water/acid from drainage pipe 156 and/or the outlet of the discharge 264.

U-trap 267 acts as means to cause bubbles of unabsorbed diatomic nitrogen gas or undissolved sulfur dioxide, if any, to be held or trapped on the upstream side of u-trap 267 in a submersion zone. Secondary discharge 264 may also be configured with a vent stack 265 (e.g., chimney). Remaining diatomic nitrogen gas in the system is permitted to escape the system through vent stack 265. Operation of the system 1*a* reveals that little, if any, sulfur dioxide escapes the system. It is believed that gas that is escaping the system is harmless diatomic nitrogen. This configuration of a sulfur acid generator eliminates the dependence upon use of a countercurrent absorption tower technology of the prior art to effect production of sulfurous acid. Nevertheless, as an added safety feature to, and to further diminish any possible sulfur smell emitting from a device, vent stack 265 may comprise a limited exhaust scrubbing tower.

In a preferred embodiment upstream from the u-trap of the second discharge pipe, a vent stack 265 houses an exhaust scrubbing tower providing a tertiary containment area. The exhaust scrubbing tower defines grill holes through which the rising, undissolved gases rise. In a preferred embodiment, the exhaust scrubbing tower comprises a cylindrical body which is constructed of polyethylene plastic which is durable, lightweight and resistant to ultra violet ray degradation. At the top of the exhaust scrubbing tower, a third source of water (e.g., water inlet 6) introduces a shower of water through an emitter inside the exhaust tower showering water downward, resulting in a countercurrent flow of undissolved gases and descending water. Any rising sulfur dioxide gas comes into countercurrent contact with the descending water, creating sulfurous acid.

The exhaust scrubbing tower is packed with path diverters, which force the countercurrent flow of sulfur dioxide gas and water to pass through a tortuous maze, increasing the duration of time the gas and water remain in contact and the surface area of the contact. Substantially all the free floating sulfur dioxide gas from the mixing tank will react with water in the tower to form sulfurous acid. Sulfurous acid created in the tower flows down into the secondary discharge. Any undissolved gases pass out of the open, upward end of the exhaust scrubbing tower to the atmosphere.

As mentioned, the water introduced into the system to the third conduit, fourth conduit and exhaust scrubbing tower may be brought from a water source to the system by any means capable of delivering sufficient water and pressure, such as a standing, elevated water tank, or mechanical, electric or diesel powered water pump. The water may be untreated or it may have sulfurous acid.

In one embodiment, select components of the system can be prepared of different materials. Commonly, such components identified below are prepared from expensive metals. However, now it has been found that such components can be replaced with corrosion resistant plastics. The components that can be made from corrosion resistant plastics can include: the sulfur supply, the mixing tank, the piping between the primary venturi and the mixing tank, the piping from the mixing tank to the secondary venturi, the piping into or out from the secondary venturi, the scrubbing pipe tower, and the piping into or out from the scrubbing pipe tower. Any one through all of these components can be made of corrosion resistant plastic.

In one embodiment, the corrosion resistant plastic can be any polyolefin that is corrosion resistant. The polyolefins can include polyethylene and polypropylene (HDPE, LDPE, UHMW, and PP). These products are recognized for their light weight and comparatively low cost. Polyethylene and polypropylene are available in various formats. Because of their excellent resistance to solvents, are not chemically bondable. However, when bonding is required, they can be bonded by thermal welding with low cost hot air welding equipment.

In one embodiment, the corrosion resistant plastic can be any PVC or CPVC. This group possesses similar outstanding chemical resistance properties as the polyolefin group but is 35% to 40% heavier and structurally more rigid. CPVC, chlorinated polyvinyl chloride, offers higher temperature resistance than PVC. Both materials are chemically and thermally bondable. PVC & CPVC offer excellent options whenever chemical resistance, ease of fabrication, and relative low cost are required.

In one embodiment, the corrosion resistant plastic can be any fluoropolymer (e.g., PTFE, FEP, PEA, PVDF, PCTFE, ECTFE, ETFE, etc.) which offer superior chemical and heat resistance, but are typically softer than other materials, and are more difficult to fabricate into tanks and vessels. Due to their higher operating temperatures and UL approvals, these materials are the solution to the most demanding applications and used within the most critical environments.

In one embodiment, any of the venturi pumps can be prepared of a corrosive resistant polymer.

The following materials are examples of the corrosive resistant materials that can be used in the components of the system.

While the system of FIGS. 1, 1A, and 3 illustrates primary and auxiliary (e.g., secondary) venturi pumps, it has now been found that adding one or more additional venturi pumps can improve the production of sulfurous acid. The additional venturi pump can rescue additional sulfur dioxide and transform it into sulfurous acid.

Figure 4:
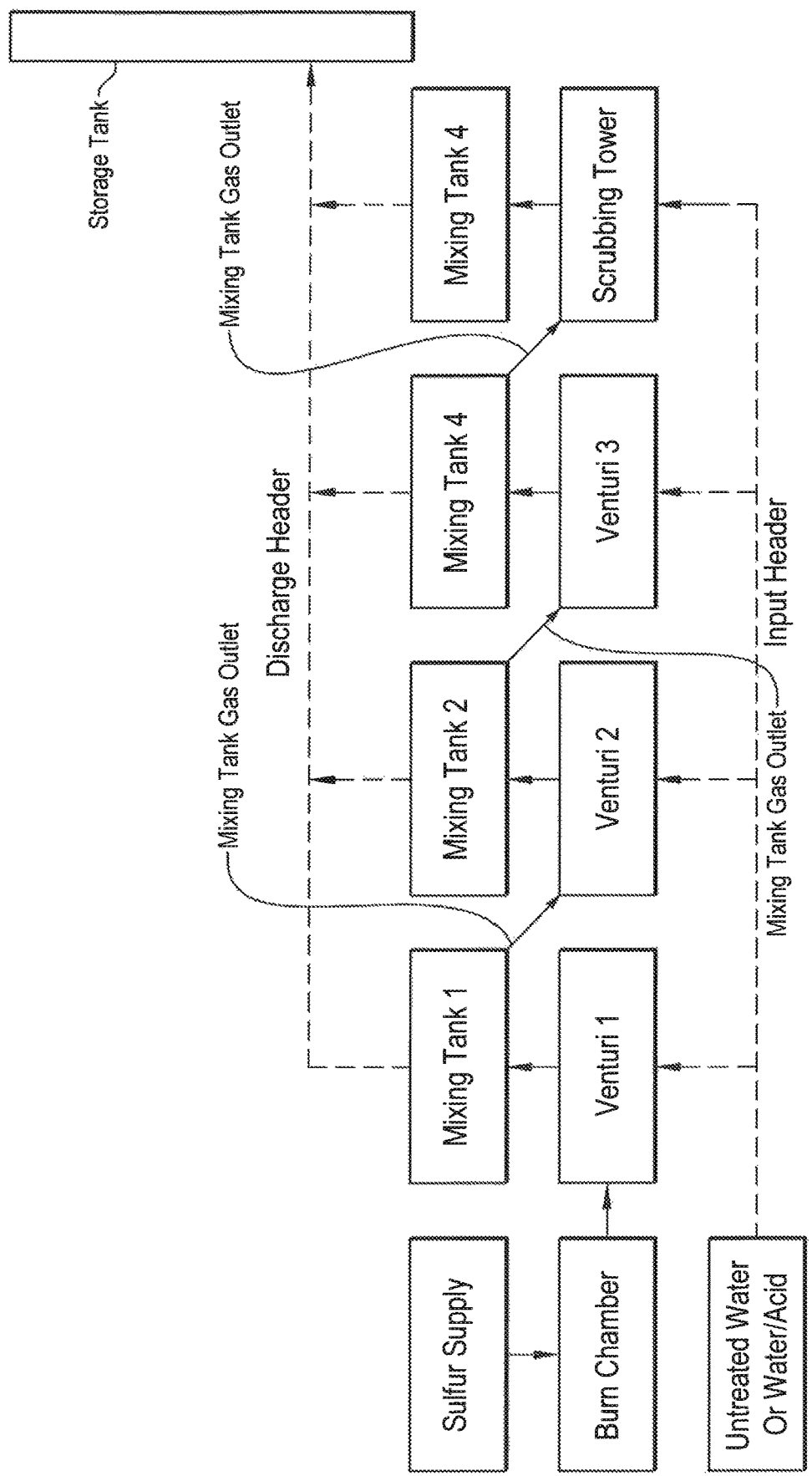
FIG. 4 is a schematic representation of a system configuration with a plurality of venturi pumps and corresponding mixing tanks.

FIG. 4 shows schematic representation of one example of a system having multiple venturi pumps. The untreated water can, of course, be substituted for water/acid that is obtained from the system, such as described herein and shown in FIG. 3. The untreated water is shown to go into an input header that supplies each of the venturi pumps. The gas inlet for each venturi of FIG. 4 is not shown, however, the gas inlet for each venturi can be any gas with sulfur dioxide, such as from the burn chamber, or from any mixing tank, such as from a mixing tank upstream in the cascade. While each outlet of the mixing tank for the water/acid is shown to go to the discharge header, the outlet may go to separate outlets or into separate collection tanks. Also, the discharge header can be recycled back to the input header. Additionally, there can be "n" venturi and "n+1" mixing tanks. Also, the liquid output of one mixing tank can be the liquid input for the next venturi pump, so that mixing tank 1 liquid output is input for venturi 2, and so forth. The mixing tank gas outlet that has sulfur dioxide is then ported to another venturi as the gas or sulfur dioxide input. Here, "n" is any integer, such as 1, 2, 3, 4, 5, 6, 7, 8, 9, 10, or more.

In one embodiment, certain operational parameters of the system can be automated. For example, the system can be configured with an automatic electric start module that operates to automatically start the burn chamber and all of the components that need to be operational for the system to produce sulfurous acid, which can include any pumps, sensors, or the like. The auto electric start can use electricity to start the burn chamber, and once the burn chamber is burning (e.g., detected by thermocouple), the system computer can automatically start the rest of the components to be operational. The automatic electric start can be configured by the system computer being programmed or receive instructions from a user for a start time, and then when that time is reached the system will start and the burn chamber will begin burning the sulfur into sulfur dioxide.

In one embodiment, the system can be configured with an automatic start and/or shutoff system. This can include the system being configured to automatically, under automation, start and/or stop the burn chamber by having a valve system that can open or close an air inlet valve so the burn chamber can receive more oxygen or no longer receives oxygen depending on the controller instructions. The valve system can also have a hopper valve that closes off sulfur from the hopper to the burn chamber or opens it if more sulfur is needed. The automatic start and/or shutoff system can have various parameters that determine when to start and/or shutoff, such as a preset time (e.g., user enters the time the system should shut off), a flow rate in a pipe (e.g., user enters a pipe and flow rate, and if the flow rate in that pipe drops below a threshold, then the system shuts off), pH in pipe or tank or outlet (e.g., user enters a pH for a pipe or location or tank, then the system shuts off when the is reached), temperature in pipe or tank (e.g., user sets the temperature threshold, max or min, and the system shuts off once that temperature threshold is reached at the location), or any other programmable threshold the user can program into the system controller computer.

In one embodiment, the sulfur supply hopper can be automated, which can include an automated stirrer to prevent clogging, automated cooler to cool the sulfur to prevent melting, or automated valve to control the amount of sulfur going into the burn chamber.

Figure 5:
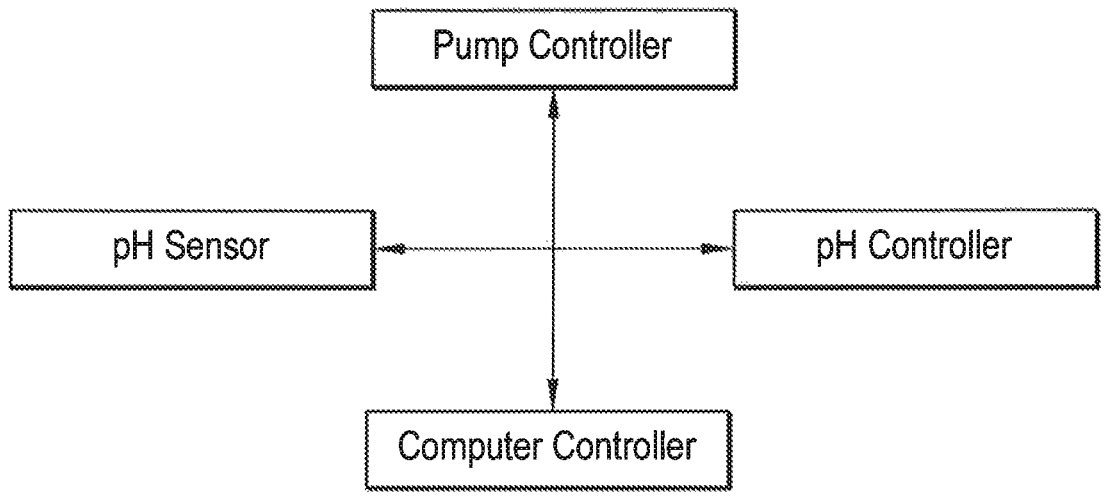
FIG. 5 is a schematic representation of a controller system for a system that produces sulfurous acid.

In one embodiment, the system can include a pH controller that receives pH data from the pH sensors in the pipes, tanks, any location, or outlets, and then determines whether to continue the production of sulfurous acid, stop the production of sulfurous acid, or start the production of sulfurous acid, or start or stop any discrete component of the system. See FIG. 5. The pH controller can be programmed by the user to have the pH threshold, maximum or minimum, that controls the starting, maintaining, or stopping of the system. In one aspect, a max pH threshold can cause an automatic start for the burn chamber, and a minimum pH can cause the automatic shutoff for the burn chamber. The pH sensor and pH controller can be operationally coupled with a computer controller, such as a standard computer with software to operate as described herein. The pump controller may also be operated to start or stop pumping in view of the pH, which can be controlled by the computer controller. Thus, pH data can be used to regulate and optimize operation of the system.

Additionally, the system can include a timer controller (e.g., computer controller) that sets times for one component or the entire system to start or stop. The user can program the timer controller for set times of the day for the components or entire system to start or stop, or set a duration of operation time for one or more components of the system.

In one embodiment, a sensor for one of the system controllers (e.g., auto start or auto shutoff) can be a float sensor 9 in a tank 130 (see FIG. 1A or 3). For example, an acid discharge tank (e.g., collection tank 2) can be coupled to the discharge header or outlet or any other acid outlet, and such tank can include a float-style sensor to monitor the acid level. As such, the float sensor 9 can provide indications of acid amount or pH in the tank (or any other tank, such as mixing tank), and then provide float data (e.g., acid data) to the computer controller. The data can be used to determine whether the system should start, continue operation, modulate operation for a target value, or stop operation.

In one embodiment, a float sensor 9 can be in an acid tank (e.g., polymeric acid holding tank) in order to control the level of acid in the tank. The signals from the float sensor 9 can guide a variable frequency drive pump 3 to control flow rates in the system. The float sensor 9 can measure the acid level in real time so that the flow rates can be modulated to alter various parameters of the system, such as maintaining or changing level of acid in any of the acid water holding tanks. The various water pumps in the system can be operated and controlled to achieve the flow rates that provide the desired level of acid.

The foregoing automation can be performed with a system controller, which can be a computer with executable instructions for operating the overall system and each of the components individually. FIG. 6 shows an example embodiment of a computer that can operate the system and components thereof. That is, every component can have one or more sensors that provide data to the system controller, and the system controller can compute the data and determine operational parameters. Such operational parameters or operations to be performed can be programmed by the user, such as programming threshold values for starting or stopping the system or any component thereof.

In one embodiment, the system controller can be operably linked to a mobile device, such as a smart phone or other mobile device (e.g., other computing device 662, FIG. 6) that operates with applications or programs. In one aspect, the mobile device can have an application that receives data from the system controller and provides instructions to the system controller. The application can be stored on a memory device of the mobile device and operate with data from the system and comments entered by the user. This allows the user to control any aspect of the system wherever they are. In one example, the mobile device is connected to the system controller over the Internet, and the user can start or stop or change operating parameters for any of the components of the system. In a specific example, the flow rates can be modulated by the user entering instructions into the application on the mobile device, which are implemented by the system controller to control the system.

The systems described herein can produce more acidic sulfurous acid having a lower pH in solution by maximizing the production of sulfurous acid. Prior generations of sulfur burners have simply burned sulfur while striving to avoid major clogging issues. The advanced designs described herein actually maximize the conversion of sulfur into sulfur dioxide gas and then sulfurous acid. As such, lower pH levels of sulfurous acid are being achieved, often with materially lower amounts of sulfur being burned per hour. The lower the pH of the produced sulfurous acid, the smaller the size of pump and power required to utilize sulfurous acid, which is a benefit.

The systems produce concentrated sulfurous acid by the following steps: a. Produce sulfurous acid; b. Capture sulfurous acid in a tank; c. Pump sulfurous acid back into the sulfur burner as a recycle; and repeat steps a-c until the pH is lowered to concentrated levels. The increased acidity of sulfurous acid has resulted in pH levels as low as 1.3 using recycling. Sulfurous acid concentrate can be stored. It has been found that the sulfurous acid concentrate continues to acidify to a lower pH in storage (e.g., observed down to 1.0 pH). The recirculating sulfur burner system (FIGS. 1, 1A, and 3), can provide sulfurous acid for sale or concentrated sulfurous acid.

In one embodiment, the operation of any of the venturi pumps can be modified so that the flow rate of the liquid inlet is slowed or increased to improve operation of the venturi as well as operation of the system. It has been found that adjusting the flow rate of the liquid inlet can adjust the flow rate of the exhaust, and slowing the flow rates can increase the ability to achieve the second burn chamber. As such, a system can be operated with a first flow rate in the candy cane, and the temperature of the second burn chamber can be determined. Then, the liquid (e.g., water or aqueous sulfurous acid) flow rate can be modulated up or down, and the temperature of the second burn chamber checked again. If the temperature increases, then the change in flow rate can be increased (up or down). Often, slowing the flow rate can enhance the temperature in the second burn chamber in the candy cane. Such second burn chamber can increase the percent of sulfur being burned in the candy cane to about 100%.

In one embodiment, the temperature of the burn chamber can cause melting of sulfur in the hopper, which can then cause a variation in temperature that can cause formation of a sulfur plug in the hopper. Such a sulfur plug in the hopper can prevent sulfur from entering into the burn chamber. Accordingly, the outlet of the hopper can include a mechanical stirrer (e.g., auger) to stir the melted sulfur to keep it from clogging the hopper. Alternatively, the hopper can include a cooler, such as at the bottom close to the burn chamber. The cooler can inhibit the sulfur from melting. The cooler can be a water jacket or heat exchanger that cools the hopper. Thus, a device that inhibits melting of the sulfur (e.g., cooler) can be used with the hopper or a device that breaks up clogs (e.g., auger) in order to inhibit clogging of the hopper. The window in the hopper can also be helpful for observing melted sulfur or sulfur plugs, and then corrective action can be performed to remove the melted sulfur or sulfur plug. Also, a vibrating mechanism can loosen the sulfur and inhibit clogging of the hopper. Alternatively, heat can melt sulfur to a flow form, and thereby the hopper can include a heater, such as a heat exchanger with the candy cane or burn chamber, to heat and melt the sulfur into a flow that flows into the burn chamber. In any event, controlling temperature of the hopper can keep it from being clogged.

In one embodiment, the primary venturi can be modified to help the formation of the secondary burn chamber in the candy cane. The primary venturi can be modified with a wide gas outlet mouth that slows down the flow rate of the exhaust in the candy cane. Any reduction of the velocity or speed of the exhaust flow in the candy cane can improve the ability to form the secondary burn chamber in the candy cane. Thus, any modification of the primary venturi to slow or reduce the exhaust flow velocity or speed in the candy cane can be used for the purpose of promoting formation of the second burn chamber in the candy cane. In one aspect, the flow rate can be reduced to be less than 80 gallons/minute (303 liters/minute) to promote the second burn chamber to form and operate, however, reduction to less than 60 gallons/minute (227 liters/minute), or less than 50 gallons/minute (189 liters/minute), or less than 40 gallons/minute (151 liters/minute) or less than 30 gallons/minute (114 liters/minute) or less than 20 gallons/minute (75.7 liters/minute) can also be useful. However, each system can have different dimensions, and thereby the flow rate for one system that produces a sufficient second burn chamber can be different from another, although slower flow rates appear to improve the second burn chamber.

In one embodiment, the liquid output from the system, such as liquid aqueous sulfurous acid, can be provided to a storage tank, such as a corrosive resistant polymer storage tank. The aqueous sulfurous acid can then be stored, shipped, or recycled for concentrate aqueous sulfurous acid production.

It has been found that cooling or chilling the water/acid at any stage can increase the generation or retention of sulfurous acid in the water, or increase the amount of sulfur dioxide in the water available for generating sulfurous acid. As such, the system can include one or more chillers thermally coupled to any of the pipes or tanks so as to cool the aqueous sulfurous acid therein. Any type of cooling system can be used, from active refrigeration to water jacket coolers to evaporative coolers.

In one embodiment, the sulfur supply (e.g., hopper) that feeds into the sulfur supply can have a window. Incorporation of a clear or translucent window within the side wall of the sulfur supply hopper allows user to immediately ascertain the level of sulfur remaining in the hopper. The window in the sulfur supply hopper can be at any location at any dimension. However, it can be advantageous for the window to extend from the bottom to the top so the amount of sulfur can be viewed. Also, the window can have a width sufficient to allow a user to view the sulfur therein. For example, the window can be 0.25, 0.5, 0.75, 1, 2, 3, 4, 5 or 6 inches, or wider. During operation, the user can view the window and determine whether or not to add additional sulfur to the sulfur supply hopper. For example, the sulfur supply hopper 20 as shown in FIG. 1 can have the window 212, which can be any dimension, such as extending from the top to the bottom of the hopper 20.

In one embodiment, the system can be mounted on a skid mount. The mounting of a sulfurous acid producing system onto a fabricated skid enhances the utility of the burner and can greatly reduce the amount of effort required to successfully install a burner. FIG. 1 shows the system mounted on a skid mount, where platform 10 is configured as the skid mount. A skid mount is a useful method of distributing and storing machinery for the military and industry, where the machinery at point of manufacture is permanently mounted in a frame or onto rails or a metal pallet. The equipment can then be easily and securely transported and used as a unit. A unit may also be temporarily placed onto a vehicle to equip it for a task. The skid mount can have wheels to facilitate movement and setup. The skid mount can be configured as a trailer to be towed. Alternatively, the skid mount can be configured to be mounted on a skid steer.

In one embodiment, the burn chamber can include a conical lid that couples the burn chamber with the candy cane pipe. The incorporation of a conical (upwards or downwards) lid enclosing the top of the burn chamber and connecting to the base of the candy cane provides desirable air movement within the burn chamber. This also facilitates the air flow and transition from the burn chamber into the candy cane. FIG. 1B shows an example of a burn chamber having a conical lid 46a, shown in dashed lines. While a two-stage conical lid 46a is shown, a single stage conical lid 46a can be used.

In one embodiment, the system can include an alternative power source 8, such as a solar panel or solar panel array to provide electricity to the system. This allows the entire system to be operational without being coupled to an electrical grid, which can allow for placement and use of the system anywhere. Also, a windmill or other electric power generator from natural sources can be used as an alternative power source, such as shown in FIG. 6.

In one embodiment, a venturi pump can be implemented in any pipe that is downstream of any of the mixing tanks or collection tanks or any tank having sulfurous acid. The venturi can receive gas (e.g., having sulfur dioxide gas) from any of these types of tanks as a gas inlet to the venturi pump, and/or can receive aqueous sulfurous acid as the liquid inlet for any venturi pump. The presence of backpressure on a sulfur burner is harmful to its proper operation. For this reason burners discharge into a body of water or into a tank unless vacuum or suction can alleviate the back pressure. When to a tank, the acidified water often degasses some sulfur dioxide. It can be possible to eliminate this off gassing to the atmosphere by sealing the connection between the burner and the tank, as well as sealing the tank itself. See FIGS. 1 and 1A that show a sulfur gas outlet at the top of the mixing tank. In order to create an environment that does not exert backpressure on the burner, a hose can be connected from the discharge vent on the tank and connected to a venturi positioned after the acid pump and ahead of the irrigation system or other end use. The movement of acid through the pipe and venturi should create a mild vacuum, which in turn should eliminate or minimize back pressure in the tank. A sealed tank will further minimize discharge of $SO_2$ to the atmosphere.

In one embodiment, the mixing of the tank off-gas back into an acidified water stream can re-acidify the water or further acidify the water in the acidified water stream. Accordingly, multiple cycles of off-gas acidification of water can decrease the pH. This allows for cycling the acidification until a desired pH is reached in the acidified water. The off-gas of any tank can be combined with the liquid flow of at any venturi pump to increase the acidity of the water. In some instances, the off-gas can be the first re-acidifying gas, and in other instances the off-gas can be the second or latter re-acidifying gas. In some instances, the off-gas can be the first further acidifying gas, and in other instances the off-gas can be the second or latter further acidifying gas.

The improved system described herein can have increased concentration of sulfurous acid, which can result in a pH of as low as about 1.3. However, a pH of 1.6 may be obtainable with less energy and/or sulfur use. A first output (without recirculation water/acid) can be about pH 2-2.5, the second output after recirculation can be about pH 1.75-2, and after a number of iterations of recirculation, the output can be acidified to a pH of about 1.3-2 or 1.6-2. The increased acidity or lower pH allows for the product sulfurous acid to be placed in storage containers for long term storage or shipping containers for shipping from a production plant to a site of use, such as a farm.

In one example, the system can operate with recirculating the sulfurous acid water from 20 to 500 recirculation passes; however, the desired acidity may be obtained with 40 to 100 recirculation passes. The system can operate fir about 45 minutes (e.g., about 30 to 35 recirculation passes) to get the pH to 1.7, and additional time can reduce the pH to 1.3 or 1.6.

In one example, the recirculation can be performed with active temperature reduction of the recirculated sulfurous acid water. The active temperature reduction can be accomplished with any of the tanks or fluid conduits being cooled. A temperature reduction of about 10 degrees F. (12.2 degrees C.) can be useful to increase acidification of the sulfurous acid water. The system can operate with the recirculated sulfurous acid water being between 40 and 70 degrees F. (4.4 and 21 degrees C.), 40 and 80 degrees F. (4.4 and 26.6 degrees C.), 40-60 degrees F. (4.4 and 15.5 degrees C.), or 40-50 degrees F. (4.4 and 10 degrees C.).

Applications for sulfurous acid are plentiful, including, among others, agriculture, turf and lawn irrigation, wastewater treatment, and coal-bed-methane water reclamation. Sulfurous acid may also be used to remove excess chlorine from wastewater, descale calcium carbonate deposits or mollusks (e.g., zebra mussels, barnacles, etc.) in pipes or other water conduits or tanks, and treat aqueous mixtures such as mine slurries, process sugar, and the like. In other cases, sulfurous acid may be applied as a nutrient for vegetation or be used as a fungicide. Also, sulfurous acid may have a secondary effect that minimizes algae populations. The sulfurous acid can be produced with the improved system, and then transported to a site for any of these or other uses.

In one aspect, the modulation of system operation parameters to obtain a select of acid water can result in the change in liquid flow rates that can also change the gas flow rates due to the operation of the venturi pumps. The modulation of the liquid pumps cascadingly changes gas flow rates in tanks, channels and chambers. The change in the gas flow rates can then cascadingly change the gas flow rate in the burn chamber, which can change the burn rate and rate of sulfur consumption in the burn chamber. The pH control thereby can control operation of the entire system to obtain the desired pH or pH range.

Continued analysis and modulation of the system operational values, and iterative operational perturbations can provide indications of improvements or advantageous operational parameters to obtained selected pH values. Such analysis of the burn chamber can improve operation and maintenance for longer term operation of the system.

In one embodiment, the burn chamber can be modified to obtain a reservoir for molten sulfur and/or burn product thereof. The molten sulfur reservoir can have various shapes or dimensions. Now, it has been found that select molten sulfur reservoir configurations can improve sulfur burn for enhanced system operation and pH control. In one aspect, a donut or torrid or annular or ring, or other similar shape or cross-sectional profile that results in a center region devoid of molten sulfur can be used for the shape of the molten sulfur reservoir can be formed, whether circular or polygonal.

Figure 7:
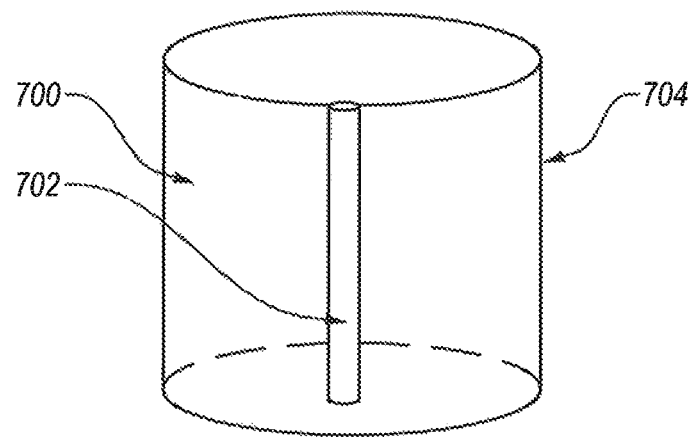
FIG. 7 illustrates a hopper configuration that forms donut-shaped molten sulfur.

FIG. 7 shows a molten sulfur reservoir 700 that has a center member 702 extending from the bottom surface. The dimension, such as diameter, of the center member 702 can be modulated in relation to the reservoir-defining walls 704. In one example, a plug insert formed as a hollow cylinder of stainless steel with a cap on it can be welded to the center of the bottom of the burn chamber or separate molten sulfur reservoir beneath the burn chamber to create a donut-shaped bath of molten sulfur in the chamber. The shaped molten sulfur can provide a temperature zone that enhances sulfur burning. The shaped molten sulfur also can reduce the total surface area of molten sulfur, and which places more exposed sulfur in the air path that is most likely to have oxygen in the air flow. This can increase burn conversion. Also, the shaped molten sulfur can lower the burn temperature in the chamber to obtained enhanced burning at a lower temperature.

Also, the shaped molten sulfur can reduce plugging of various flow channels that is caused by sulfur agglomeration of the inside of the flow channels. This indicates that the shaped molten sulfur can reduce sulfur plugging of flow channels by more complete sulfur burning and generation of sulfur dioxide. The higher conversion rate to sulfur dioxide can reduce plugging and clogging of flow channels by resulting in less elemental sulfur in exhaust gas. By operation of the burner with the shaped molten sulfur, less solids plugged flow channels in a larger burners. The ability to increase sulfur burn conversion to sulfur dioxide can allow for better control of the boiling or evaporation of solid sulfur into the gas stream by use of variable diameter center member or plug. By iterative operational studies, the optimal size of the center member can determined.

In one embodiment, operational parameters of the burn chamber can be modulated by use of a conical lid together with the shaped molten sulfur reservoir. A synergistic burn enhancement was determined to be possible by contribution of the function of the conical lid to facilitate the optimal air flow characteristics within the burn chamber so as to extract the sulfur dioxide gas, without or limiting vaporizing elemental sulfur, and while not allowing excess heat to increase temperatures in the burn chamber past optimal values. The lower burn temperatures can improve sulfur burn conversion to sulfur dioxide rates and inhibit sulfur vaporization. By coupling the conical lid with the shaped molten sulfur reservoir, the burn chamber can operate at optimized parameters to facilitate production of sulfurous acid.

In one embodiment, the system can be optimized by iterative configuration modulation of certain features of the burn chamber and gas flow rates into the burn chamber, within the burn chamber, or through the exhaust pipe (e.g., candy cane). For example, burn chamber diameter and/or height (e.g., cross-sectional and/or volumetric) can be modulated together or separately from the exhaust pipe diameter (e.g., luminal inner diameter) and/or length. The independent or relative dimension modulations can be performed with the burn chamber constant and varying the candy cane, or varying the burn chamber and holding the candy cane constant. Once an improved configuration of relative dimension between the burn chamber and candy cane is obtained, then one can be held constant and the other varied then the other constant and the one being, varied, where iterations can be performed to obtain an optimized burn chamber and candy cane combination with optimal cross-sectional profile and volumetric profiles.

Figure 8:
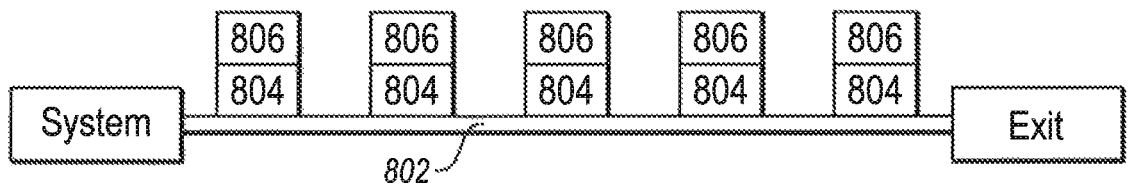
FIG. 8 is a schematic representation of a pH data loggers on an irrigation pipe.

In one embodiment, the system can be configured to provide sulfurous acid to a site of sulfurous acid use, such as a farm, via an irrigation pipe. Since the acidity of the sulfurous acid can be important, the system can include the irrigation pipe having one or more pH sensors that read the pH of the sulfurous acid passing therethrough. FIG. 8 shows an example of the system with the irrigation pipe 802 having the pH sensors 804 with data loggers 806. The pH sensors 804 can be placed at a number of locations, such as right at the exit from the system, and right at the exit of the irrigation pipe. The data loggers 806 can transmit (wired or wirelessly) pH data to the computer system that controls operation of the system. Alternatively, the pH sensors 804 can be communicatively coupled with the system (e.g., computer controller), such as by wired or wireless (e.g., radio). In one aspect, one or more of the pH sensors 804 can be coupled to at least one data logger 806 that logs the data of the pH at a point in time and over a period of time. The data logger 806 or each data logger 806 can be any computing system or coupled to any computing system that can provide the logged data to the main computing system of the system by any wired, optical or wireless transmission. The main computing system can modulate the operational parameters to vary the pH in the irrigation pipe at any location to any desired pH of 1.3 or higher. The data logger or main computing system can analyze the logged data and generate pH reports and/or graphs for the pH at time points at any pH sensor or over time periods. In one aspect, the data logger can have a memory device to record and save the data. In one aspect, the data logger can have an output device, such as one that can receive a USB or other memory device.

In one embodiment, a sulfuric acid generating system can include: a sulfur supply hopper; a burn chamber operably coupled to the sulfur supply hopper; an exhaust pipe extending from the burn chamber so that burned sulfur exhaust traverses the exhaust pipe; and a primary venturi pump having a gas inlet coupled to an outlet of the exhaust pipe, wherein a secondary burn chamber is located in the exhaust pipe. The exhaust pipe can be a candy cane pipe having an up section, bend section, and down section, the primary venturi pump being coupled to the outlet at the end of the down section. The secondary burn chamber can be between the burn chamber and the bend section of the candy cane pipe. The exhaust pipe can include a secondary burn member to promote formation of the secondary burn chamber. The exhaust pipe can include an insulating member to promote formation of the secondary burn chamber. The exhaust pipe can include an insulating member on an outside surface of the exhaust pipe to promote formation of the secondary burn chamber. The exhaust pipe can include an insulating member wrapped around the circumference of the exhaust pipe and having a longitudinal length along the exhaust pipe so as to provide a heat-retaining area of the exhaust pipe to promote formation of the secondary burn chamber. The secondary burn chamber can have a same cross-sectional dimension and/or profile as the exhaust pipe. The secondary burn chamber can have a different cross-sectional dimension and/or profile as the exhaust pipe. The secondary burn chamber can have has an operational temperature of about 600 degrees F. (316 degrees C.), or from 400 degrees F. to 1200 degrees F. (204 degrees C. to 649 degrees C.). The secondary burn chamber can have an exhaust transit time of about 0.1 seconds to 2 seconds, or about 0.2 seconds to 1 second, or about 0.3 seconds. The exhaust pipe can include an external burn chamber around the secondary burn chamber, such that the external burn chamber is a separate chamber with the exhaust pipe passing therethrough. The exhaust pipe can include an external heat generator around the secondary burn chamber, such that the external heat generator is a separate chamber with the exhaust pipe passing therethrough. The secondary burn chamber can include an ignition source to ignite combustion of sulfur in the secondary burn chamber. The cross-sectional and/or volumetric ratios between the primary burn chamber and candy cane exhaust pipe can be optimized for formation of the secondary burn chamber.

In one embodiment, the exhaust pipe outlet can be inserted into the venturi past a venturi plate. The exhaust pipe outlet can be inserted into the venturi past the venturi plate at a distance sufficient to inhibit sulfur buildup in pipes of the system. The exhaust pipe outlet can be inserted into the venturi past the venturi plate at a distance sufficient to inhibit sulfur buildup in the exhaust pipe. The distance of insertion can be defined by an iterative process, and the distance can be an optimal distance.

In one embodiment, the system can include a variable setting configuration in the venturi that allows for adjustment of the exhaust pipe outlet that can be adjusted inward or outward relative to the venturi plate during operation of the system to vary the distance. The primary venturi can include a variable setting controller that can control the distance of the exhaust pipe outlet relative to the venturi plate, where the variable setting controller can be electronically operated and controlled, such as the variable setting controller being operably coupled to a system controller computing system.

In one embodiment, the system can include a system controller computing system operably coupled to components of the system so as to computationally control the components of the system. The system controller can have control modules that can control component controllers of the components of the system. The system controller can be operably coupled to component controllers of: a primary burn chamber, primary venturi (e.g., variable setting), second venturi (e.g., variable setting) secondary burn chamber, air inlet into the primary burn chamber, air inlet into the secondary burn chamber, a sulfur supply hopper, a valve in the sulfur supply hopper, water pump to primary venturi, water pump to secondary venturi, mechanical mixer of mixing tank, pH meter, flow sensors in flow pipes, valves in flow pipes, or other. The system controller can be programmed to implement automation to the system. The system controller can include an automatic electric start/stop module that is operable coupled to an automatic electric start/stop component of the primary burn chamber and/or secondary burn chamber. The automatic electric start/stop component can be configured to automatically start/stop the primary burn chamber and/or secondary burn chamber upon receiving instructions from the automatic start/stop module. The automatic start/stop module can have user instructions for providing a start/stop parameter, such as start/stop time, or conditions of the system to implement a start/stop for the primary chamber, or a pH threshold that when achieved causes the primary burn chamber (or secondary burn chamber) to start/stop. The automatic electric start/stop module can be operably coupled to a component controller of a component of the system so as to provide start/stop instructions. The system controller can include an input interface that is configured to receive instructions from the client. The system controller can be operably coupled to one or more sensors that provide operational parameters for components of the system, such as the one or more sensors being flow rate sensors, pH sensors, temperature sensors, fluid level sensors, sulfur level sensors, sulfur dioxide sensors, oxygen sensors, or other sensors. The system controller can include a non-transitory computer readable medium having computer executable instructions for performing a methodology of operating the system to produce sulfurous acid. The computer executable instructions can include instructions to perform actions in response to data from one or more sensors, the actions including adjusting operational parameters of one or more components, starting the one or more components, or stopping the one or more components, such as the primary burn chamber and/or secondary burn chamber.

In one embodiment, the sulfur supply hopper includes a clog inhibiting device. The clog inhibiting device can be one or more of the following: vibrator, stirrer, shaker, auger, or other. The sulfur supply hopper can include a heat exchanger so as to change the temperature thereof. The sulfur supply hopper can include a heater so as to heat the sulfur to a flowable format. The sulfur supply hopper can include a cooler so as to cool the sulfur to retain the sulfur as a solid, such as a flowable collection of solids. The sulfur supply hopper can be automated, where the automated sulfur supply hopper can include an automated clog inhibitor, automated cooler, automated heater, or automated output flow valve. The hopper can include a hopper window mounted in the sulfur supply hopper, wherein the hopper window is translucent or transparent. Optionally, the hopper window extends from a bottom portion of the sulfur supply hopper to a top portion of the sulfur supply hopper. The hopper window can be heat resistant. The hopper window can be of sufficient width to observe whether or not sulfur is within the hopper. The hopper can include a plurality of hopper windows in the sulfur supply hopper.

In one embodiment, the system controller can include a module operably coupled to one or more pH sensors in the system, the pH module configured to receive operational pH data and provide to the system controller operational instructions in response to the operational data. The system can include a pH sensor and pH controller system.

In one embodiment, the system controller can include a timer control module that is configured for modulating, starting, or stopping operation of one or more components of the system at a time set by a user.

In one embodiment, the system can include a sulfurous acid retention tank, which can optionally include a float-style pH sensor. The float-style pH sensor can be operably coupled with the system controller so as to provide pH data. The system can include a float sensor in a sulfurous acid containment tank, the float sensor configured to detect acid water level for level control.

In one embodiment, the system can include a transceiver configured to be operably coupled with a communications network, the transceiver being operably coupled with the system controller so as to exchange data therewith. The system can include a mobile device operably coupled with the transceiver over the communications network. The mobile device can include a memory device with a system control application stored thereon. The system control application can include a user interface that provides operational parameters of the system. The system control application can include a user interface for the user to enter operational parameter settings for the system. The system control application presents a graphical user interface to provide data and receive instructions from user. The system control application can be configured to control operation or change operation or start or stop operation of one or more components of the system.

In one embodiment, the system can include a sulfurous acid storage tank fluidly coupled with a sulfurous acid output of the system. The sulfurous acid storage tank can be made from corrosion resistant plastic. The sulfurous acid storage tank can have a liquid output configured to be coupled with an output hose (rigid or flexible), where the output hose can be operably coupled to an outlet pump that can pump sulfurous acid through the output hose. The output hose can be operably coupled with an irrigation system. The output hose can be operably coupled to a sulfurous acid tanker vehicle. The system can have a plurality of sulfurous acid outputs, each being operably coupled with a sulfurous acid storage tank. The system can include one or more sulfurous acid mixing tanks or sulfurous acid storage tanks having an output fluidly coupled with or without a pump to a liquid inlet of one or more venturi pumps.

In one embodiment, the system can include at least three venturi pumps configured to receive gas having sulfur dioxide and mix the gas with a liquid selected from water or aqueous sulfurous acid. The system can include more than three venturi pumps configured to receive gas having sulfur dioxide and mix the gas with a liquid selected from water or aqueous sulfurous acid. In one embodiment, at least two of the venturi pumps have liquid inlets that are fluidly coupled to a one or more sulfurous acid mixing tanks or sulfurous acid storage tanks. There can be "n" venturi pumps, wherein at least "n–1" venturi pumps have liquid inlets fluidly coupled with liquid outlets of sulfurous acid mixing tanks or sulfurous acid storage tanks and gas inlets fluidly coupled with gas outlets of sulfurous acid mixing tanks or sulfurous acid storage tanks. In one aspect, all of the venturi pumps can have an outlet upstream of a mixing tank. In one aspect, one venturi pump does not have a fluid inlet or gas inlet fluidly coupled with and downstream from a mixing tank or sulfurous acid storage tank. The system can include an aqueous sulfurous acid outlet of a mixing tank or storage tank that has aqueous sulfurous acid fluidly coupled with a liquid inlet of a venturi pump of the system such that aqueous sulfurous acid is mixed with gas having sulfur dioxide in the venturi pump. One or more of the mixing tanks can have an outlet fluidly coupled to and upstream of a venturi pump.

In one embodiment, the system can include an acid resistant pump between the aqueous sulfurous acid outlet of the mixing tank or storage tank and liquid inlet of the venturi pump. The acid resistant pump can be between the aqueous sulfurous acid outlet of the mixing tank or storage tank and liquid inlet of the primary venturi pump. The acid resistant pump can be between the aqueous sulfurous acid outlet of the mixing tank or storage tank and liquid inlet of a secondary or tertiary venturi pump. The acid resistant pump can be fluidly coupled to the outlet of a primary, secondary, or tertiary mixing tank. An acid resistant pump can be located between an outlet of a mixing tank or storage tank having aqueous sulfurous acid and an irrigation system.

In one embodiment, various components can be prepared from corrosion resistant plastic, such as: one or more mixing tanks are prepared from a corrosion resistant plastic; the sulfur supply hopper is prepared from corrosion resistant plastic; piping between an outlet of a venturi pump and a mixing tank is prepared from corrosion resistant plastic; piping between a liquid outlet of a mixing tank and liquid inlet of a venturi pump is prepared from corrosion resistant plastic; a venturi pump; and/or a scrubbing tower is prepared from corrosion resistant plastic. However, the burn chamber, exhaust pipe, and venturi pumps have bodies that are not corrosion resistant plastic.

In one embodiment, the system can include a conical burn chamber lid on the burn chamber. The conical burn chamber lid can enclose a top of the burn chamber and is connected to a base of the exhaust pipe. The conical burn chamber lid can improves air movement within the burn chamber.

In one embodiment, each burn chamber has an exhaust upstream and fluidly coupled to a liquid tank.

In one embodiment, from the burn chamber to outlets of the one or more mixing tanks, the system is closed and not open to the atmosphere. The system can be configured to prevent off gassing from one or more mixing tanks or storage tanks. The system can be configured to inhibit backpressure to the burn chamber.

In one embodiment, a liquid and/or gas outlet of the mixing tank or storage tank can be upstream and fluidly coupled to a liquid and/or gas inlet of a secondary or tertiary or quaternary venturi pump.

In one embodiment, the system can include a shaped molten sulfur reservoir in the burn chamber or below the burn chamber.

In one embodiment, a method of producing sulfurous acid, the method comprising: providing the system of one of the system embodiments; and burning sulfur in the burn chamber so as to produce sulfurous acid. The method can include causing formation of the secondary burn chamber. The method can include modulating liquid flow through the primary venturi pump so as to cause formation of the secondary burn chamber or maintain operation of the secondary burn chamber. The method can include modulating air flow into the burn chamber so as to cause formation of the secondary burn chamber or maintain operation of the secondary burn chamber. The method can include modulating temperature of the burn chamber so as to cause formation of the secondary burn chamber or maintain operation of the secondary burn chamber. The method can include modulating exhaust flow from the primary burn chamber through the secondary burn chamber to have a residence time in the secondary burn chamber of about 0.3 seconds+/– 10%. The method can include increasing insulation on the exhaust pipe so as to cause formation of the secondary burn chamber or maintain operation of the secondary burn chamber. The method can include varying the depth of insertion of the discharge end of the exhaust pipe into the primary venturi pump. The method can include pumping aqueous sulfurous acid to a liquid inlet of a venturi pump. The method can include recirculating aqueous sulfurous acid through the system so as to increase acidity thereof. The method can include mixing off-gas from a tank having sulfurous acid with water to re-acidify or further acidify the water. The method can include recirculating aqueous sulfurous acid through the system so as to decrease pH to a desirable pH. The method can include recirculating aqueous sulfurous acid through the system so as to decrease the pH of about 2 to about 1.3. The method can include modulating temperature in the exhaust pipe so as to cause formation of the secondary burn chamber.

In one embodiment, the method can include operating the system with automation. The method can include automatically starting the system upon reaching a programmed operational parameter (E.g., desired aqueous sulfurous acid pH or secondary burn chamber formation). The method can include automatically stopping the system upon reaching a programmed operational parameter. The method can include automatically modulating operation of the system upon reaching a programmed operational parameter. The method can include automatically starting, stopping or modulating the system upon reaching a programmed pH of product aqueous sulfurous acid. The method can include automatically starting, stopping or modulating the system upon reaching a programmed time or operational duration.

In one embodiment, the method can include viewing sulfur in the sulfur supply hopper through the hopper window.

In one embodiment, the method can include moving the system on a skid mount.

In one embodiment, the method can include burning sulfur in the burn chamber, wherein the burn chamber includes a conical lid.

In one embodiment, the method can include operating the system so as to inhibit backpressure to the burn chamber.

In one embodiment, the method can include pumping a liquid outlet from a mixing tank or storage tank to a liquid inlet of a venturi pump.

In one embodiment, the method can include providing a gas outlet from a mixing tank or storage tank to a gas inlet of a venturi pump.

In one embodiment, the method can include providing aqueous sulfurous acid from the system to an irrigation system.

In one embodiment, the method can include operating the system so that three or more venturi pumps mix aqueous liquid with sulfur dioxide gas.

In one embodiment, the method can include operating the system so as to inhibit clogging the sulfur supply hopper. The method can include de-clogging the sulfur supply hopper.

In one embodiment, the method can include discharging product aqueous sulfurous acid into a corrosion resistant polymer tank.

In one embodiment, the method can include cooling a component having water in contact with sulfur dioxide so as to increase formation of sulfurous acid.

In one embodiment, the method can include starting, stopping, or modulating operation of the system by entering input into an application on a mobile device that is connected to a system controller of the system.

In one embodiment, the method can include determining pH of aqueous sulfurous acid in a tank by using a float-style pH meter.

In one embodiment, the method can include operating the system under only solar power or other alternative energy (e.g., wind, hydro).

In one embodiment, the method can include pressurizing an aqueous sulfurous acid liquid outlet of the system with one or more pumps.

In one embodiment, one or more of the method steps outlined above can be implemented under control of a computing system. Accordingly, the present methods can include aspects performed on a computing system. As such, the computing system can include a memory device that has the computer-executable instructions for performing the method. The computer-executable instructions can be part of a computer program product that includes one or more algorithms for performing any of the methods of any of the claims.

Figure 10:
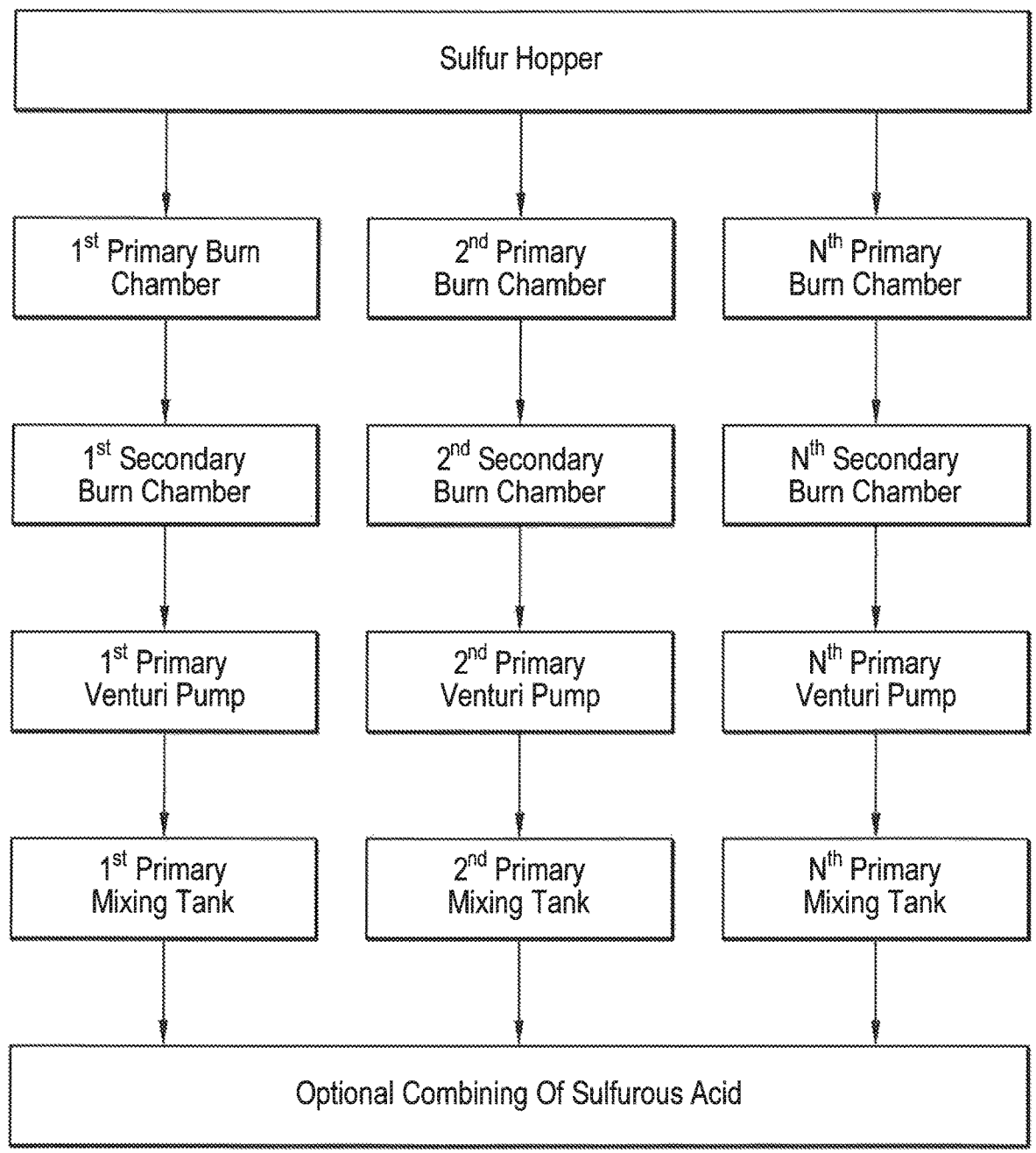
FIG. 10 shows a schematic representation of a system that includes a single hopper feeding multiple primary burn chambers and secondary burn chambers to operate and generate sulfurous acid as described herein.

FIG. 10 is a schematic representation of a system that has a single sulfur hopper that feeds multiple primary burn chambers, where there can be "N" primary burn chambers, and N is an integer of 2 or greater. Each primary burn chamber is fluidly coupled to a secondary burn chamber that in turn is fluidly coupled with a primary venturi pump that in turn is fluidly coupled to a primary mixing tank. Optionally, the outputs from the primary venturi pumps or from the primary mixing tanks can be combined to mix the sulfurous acid. Optionally, the sulfurous acid from each primary mixing tank can be passed through secondary, tertiary, or additional venturi pumps, and/or collected or stored as described herein. Thus, a single sulfur hopper can feed a system with multiple distinct pathways that include primary and secondary burn chambers to form the sulfur dioxide and subsequently sulfurous acid.

In one embodiment, the system of FIG. 10 can omit one or more (or all) of the secondary burn chambers, where the primary burn chambers can be piped directly to the primary venturi pump without a secondary burn chamber. Here, the configuration can enhance the formation of sulfurous acid.

EXAMPLE

In an experiment, an embodiment without a deflector was compared to an embodiment with a deflector. The results are as follows:

Standard SW500 Candy Cane—80 inches (203 cm) long stretched out was used without a deflector. The temperature zones were as follows (no deflector); primary burn chamber temperatures vary from 300 degrees F. to 600 degrees F. (149 degrees C. to 316 degrees C.); first 3 inches (7.62 cm) of the candy cane (cool zone) temperatures vary from 250 degrees F. (121 degrees C.) to a maximum of 500 degrees F. (260 degrees C.), where this portion extends from 1% to 5% percent of total length, and may vary from 1 inch (2.54 cm) to 4 inches (10.16 cm); secondary burn chamber and is the hottest zone in exhaust pipe having a temperature range from 500 degrees F. (260 degrees C.) to a maximum of 1200 degrees F. (649 degrees C.), where the secondary burn chamber extends from 5% to 40% percent of total length, and may vary from 6 inches (15.24 cm) to 30 inches (76.2 cm); extension of secondary burn chamber, which is a hot zone but tapering towards a cooler zone has a temperature range of 400 degrees F. (204 degrees C.) to a maximum of 1000 degrees F. (537.8 degrees C.), where this region has a percentage length of 40% to 75% of total length, and may vary from 30 inches (76.2 cm) to 60 inches (152 cm); and a final section where the temperature cools down prior to the primary venturi pump, which optimally has a temperature of less than 400 degrees F. (204 degrees C.), and can be gradually dropping from as much as 800 degrees F. (427 degrees C.) down to 600 degrees F. (316 degrees C.), 500 degrees F. (260 degrees C.), 400 degrees F. (204 degrees C.), 300 degrees F. (149 degrees C.), and possibly cooler prior to connecting to the primary venturi pump, where this section has a percentage length from 75% to 100% of the total length.

Standard SW500 Candy Cane—80 inches (203 cm) long stretched out was used with a deflector. The temperature zones were as follows (with deflector): primary burn chamber temperatures vary from 600 degrees F. to 1200 degrees F. (316 degrees C. to 649 degrees C.); secondary burn chamber and is the hottest zone in exhaust pipe having a temperature range from 600 degrees F. (316 degrees C.) to a maximum of 1200 degrees F. (649 degrees C.), where the secondary burn chamber extends from 1% to 50% percent of total length, and may vary from 1 inches (2.54 cm) to 40 inches (102 cm); extension of secondary burn chamber, which is a hot zone but tapering towards a cooler zone has a temperature range of 400 degrees F. (204 degrees C.) to a maximum of 800 degrees F. (427 degrees C.), where this region has a percentage length of 50% to 75% of total length, and may vary from 40 inches (102 cm) to 60 inches (152 cm); and a final section where the temperature cools down prior to the primary venturi pump, which optimally has a temperature of less than 400 degrees F. (204 degrees C.), and can be gradually dropping from as much as 800 degrees F. (427 degrees C.) down to 600 degrees F. (316 degrees C.), 500 degrees F. (260 degrees C.), 400 degrees F. (204 degrees C.), 300 degrees F. (149 degrees C.), and possibly cooler prior to connecting to the primary venturi pump, where this section has a percentage length from 75% to 100% of the total length. Here, the temperature in the secondary burn chamber can increase from a point between the primary burn chamber and secondary burn chamber.

In one embodiment, any of the operations, processes, methods, or steps described herein can be implemented as computer-readable instructions stored on a computer-readable medium. The computer-readable instructions can be executed by a processor of a wide range of computing systems from desktop computing systems, portable computing systems, tablet computing systems, hand-held computing systems as well as network elements, base stations, femtocells, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of a non-transitory signal bearing medium used to actually carry out the distribution. Examples of a non-transitory signal bearing medium include, but are not limited to, the following: a recordable type medium such as a floppy disk, a hard disk drive, a CD, a DVD, a digital tape, a computer memory, etc. A transmission type medium such as a digital and/or an analog communication medium (e.g., a fiber optic cable, a waveguide, a wired communications link, a wireless communication link, etc.) are not considered to be non-transitory signal bearing media.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and application programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

FIG. 6 shows an example computing device 600 (e.g., computer) that is arranged to perform any of the computing methods described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a determination application 626 that is arranged to perform the functions as described herein including those described with respect to methods described herein. Program Data 624 may include determination information 628 that may be useful for analyzing the contamination characteristics provided by the sensor unit 240. In some embodiments, application 622 may be arranged to operate with program data 624 on operating system 620 such that the work performed by untrusted computing nodes can be verified as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media (e.g., non-transitory) for carrying or having computer-executable instructions or data structures stored thereon. Such computer-readable media can be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety: U.S. Pat. Nos. 8,951,479; 7,767,162; 7,182,919; 6,689,326; 6,506,347; 6,500,391; 6,248,299; 6,080,368; U.S. RE-42,239; and U.S. 20003/0211018. It should be understood that the improvements in the systems and methods for producing sulfurous acid can be applied to the systems and methods of these patent documents. Arranging, configuring, and operating any of the systems with any of the methods wider the improvements described herein is well within the skill of one of ordinary skill in the art.

The invention claimed is:

1. A sulfuric acid generating system comprising:
   a primary burn chamber;
   an exhaust having an elongate exhaust pipe extending from the primary burn chamber at a first end so that burned sulfur exhaust traverses the elongate exhaust pipe from the first end to an opposite second end, wherein the elongate exhaust pipe has an outlet at a bend in the exhaust;
   an insulation member wrapped around the elongate exhaust pipe so as to form a secondary burn chamber within the elongate exhaust pipe at a position located between the first end and second end of the elongate exhaust pipe; and
   a primary venturi pump having a gas inlet fluidly coupled to the exhaust downstream from the bend, the primary venturi pump having an aqueous media inlet and having a fluid outlet.

2. The system of claim 1, comprising a flow deflector in the exhaust between the primary burn chamber and the secondary burn chamber.

3. The system of claim 2, wherein the flow deflector includes one or more flow members in a flow deflector chamber that restrict the flow of burned sulfur exhaust from the primary burn chamber to the secondary burn chamber.

4. The system of claim 1, wherein the elongate exhaust pipe includes in sequence a first section, the secondary burn chamber, and a second section that is coupled with the bend.

5. The system of claim 1, wherein the fluid outlet of the primary venturi pump is fluidly connected to a primary mixing tank that is fluidly coupled to a secondary venturi pump.

6. The system of claim 5, wherein a fluid outlet of the secondary venturi pump is fluidly connected to a secondary mixing tank that is fluidly coupled to a tertiary venturi pump.

7. The system of claim 6, wherein a fluid outlet of the tertiary venturi pump is fluidly connected to a tertiary mixing tank that is fluidly coupled to a quaternary venturi pump.

8. The system of claim 1, further comprising at least one fluid outlet that supplies aqueous sulfurous acid, wherein the at least one fluid outlet is fluidly coupled with the aqueous media inlet of the primary venturi pump.

9. The system of claim 8, further comprising a plurality of venturi pumps in series between the secondary burn chamber and the at least one fluid outlet, wherein the at least one fluid outlet is fluidly coupled with aqueous media inlets of the plurality of venturi pumps.

10. The system of claim 1, further comprising a computer configured as a system controller, the computer being operably coupled to one of more of: pH sensors; flow sensors; pumps; temperature sensors; fluid level sensors; sulfur level sensors; sulfur dioxide sensors; or oxygen sensors.

11. A method of producing sulfurous acid, the method comprising:
   providing the system of claim 1;
   providing sulfur to the primary burn chamber;
   burning a first portion of the sulfur in the primary burn chamber to form a first portion of sulfur dioxide;
   burning a second portion of the sulfur in the secondary burn chamber at the insulation member to form a second portion of sulfur dioxide; and
   mixing the first portion and second portion of sulfur dioxide with an aqueous composition so as to produce aqueous sulfurous acid.

12. The method of claim 11, wherein the burning of the first portion and the second portion of sulfur burns greater than or about 90% of total sulfur.

13. The method of claim 11, wherein the produced aqueous sulfurous acid has a pH less than or about 2.25.

14. The method of claim 11, comprising passing the formed sulfur dioxide through at least three sequential venturi pumps.

15. The method of claim 11, comprising deflecting cyclonic exhaust in the primary burn chamber with a deflector before the first portion of sulfur dioxide reaches the secondary burn chamber.

16. The method of claim 11, comprising burning sublimated sulfur in the secondary burn chamber, wherein the sublimated sulfur that sublimates from the primary burn chamber.

17. The method of claim 11, comprising modulating exhaust flow through the exhaust pipe so as to burn sulfur in the secondary burn chamber.

18. The method of claim 11, comprising:
   measuring pH of the produced aqueous sulfurous acid; and
   recycling the produced aqueous sulfurous acid back through the system if the pH is above a target pH threshold; or
   collecting the produced aqueous sulfurous acid for use if the pH is at or below a target pH threshold.

* * * * *